US012596073B2

(12) United States Patent
Shoseyov et al.

(10) Patent No.: US 12,596,073 B2
(45) Date of Patent: Apr. 7, 2026

(54) NANOSCALE OPTICAL BIOSENSOR BASED ON MATERIAL-ASSOCIATED SINGLE WALLED CARBON NANOTUBES

(71) Applicant: YISSUM RESEARCH DEVELOPMENT COMPANY OF THE HEBREW UNIVERSITY OF JERUSALEM LTD., Jerusalem (IL)

(72) Inventors: Oded Shoseyov, Shoham (IL); Vladislav Shumeiko, Eshkolot (IL); Yossef Paltiel, Maskeret Batya (IL)

(73) Assignee: YISSUM RESEARCH DEVELOPMENT COMPANY OF THE HEBREW UNIVERSITY OF JERUSALEM LTD, Jerusalem (IL)

( * ) Notice: Subject to any disclaimer, the term of this patent is extended or adjusted under 35 U.S.C. 154(b) by 44 days.

(21) Appl. No.: 17/999,430

(22) PCT Filed: May 25, 2021

(86) PCT No.: PCT/IL2021/050613
§ 371 (c)(1),
(2) Date: Nov. 21, 2022

(87) PCT Pub. No.: WO2021/240516
PCT Pub. Date: Dec. 2, 2021

(65) Prior Publication Data
US 2024/0019374 A1    Jan. 18, 2024

Related U.S. Application Data

(60) Provisional application No. 63/029,970, filed on May 26, 2020.

(51) Int. Cl.
*G01N 21/64*    (2006.01)
*B82Y 15/00*    (2011.01)
*G01N 21/78*    (2006.01)

(52) U.S. Cl.
CPC .......... *G01N 21/6489* (2013.01); *B82Y 15/00* (2013.01); *G01N 21/783* (2013.01)

(58) Field of Classification Search
CPC ............. G01N 21/6489; G01N 21/783; G01N 2021/6421; G01N 2021/7786; B82Y 15/00
See application file for complete search history.

(56) References Cited

U.S. PATENT DOCUMENTS

2011/0045523 A1*   2/2011   Strano .................... G01N 33/84
                                        436/151
2011/0269243 A1* 11/2011   Strano .................... B82Y 30/00
                                        977/750

(Continued)

FOREIGN PATENT DOCUMENTS

WO    2017/096317 A1   6/2017
WO    2020/097268 A1   5/2020

OTHER PUBLICATIONS

Galkina Anna N. et al: "Static and Dynamic Sorption of Free Amines on Surface of Carbon Nanotubes Modified with Nanolayers of Polymer" Diffusion and Defect Data, Solid State Data. Part A, Defect and Diffusion Forum, vol. 386, Sep. 1, 2018, pp. 244-249.

(Continued)

*Primary Examiner* — Sang H Nguyen
(74) *Attorney, Agent, or Firm* — FisherBroyles, LLP; Roger L. Browdy; James E. Mrose

(57) ABSTRACT

The invention subject of the present application generally concerns photoluminescent sensor devices for detecting a change in a gaseous environment.

19 Claims, 30 Drawing Sheets

(56) References Cited

U.S. PATENT DOCUMENTS

| | | | |
|---|---|---|---|
| 2012/0156099 A1* | 6/2012 | Zhong | B82Y 15/00 |
| | | | 422/82.02 |
| 2013/0113359 A1* | 5/2013 | Swager | H01J 63/02 |
| | | | 313/232 |
| 2014/0080122 A1* | 3/2014 | Strano | G01N 33/84 |
| | | | 536/26.6 |
| 2015/0133752 A1* | 5/2015 | Iverson | A61B 5/1459 |
| | | | 600/316 |
| 2016/0195488 A1* | 7/2016 | Ensor | G01N 27/227 |
| | | | 422/69 |
| 2018/0356404 A1* | 12/2018 | Strano | G01N 33/5097 |
| 2020/0057019 A1* | 2/2020 | Shkunov | G01N 27/4141 |

OTHER PUBLICATIONS

Shumieko Vlad et al: "A Nanoscale Optical Biosensor Based on Peptide Encapsulated SWCNTs for Detection of Acetic Acid in the Gaseous Phase" Sensors and Actuators B: Chemical, Elsevier BV, NL, vol. 327, Sep. 18, 2020.

* cited by examiner

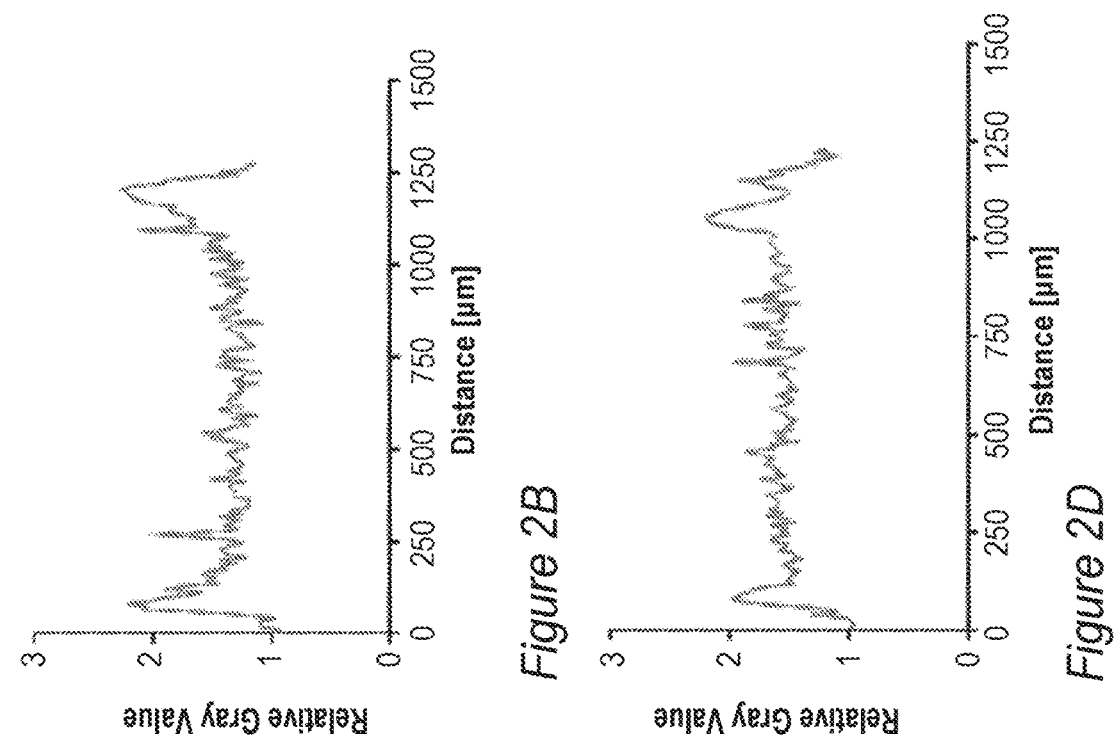
*Figure 2B*
*Figure 2D*
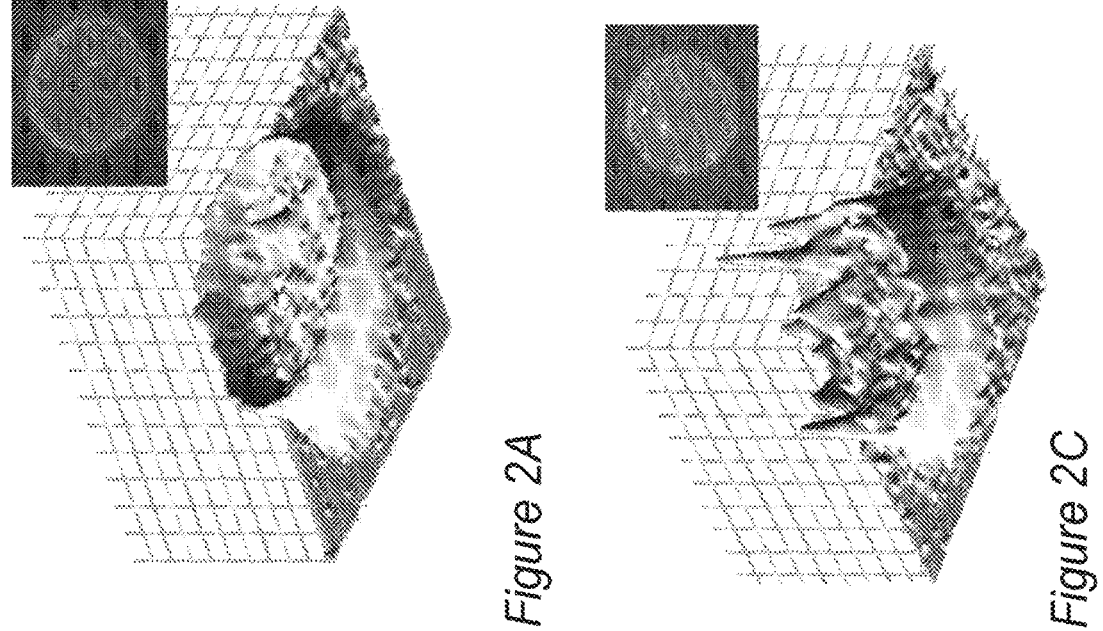
*Figure 2A*
*Figure 2C*

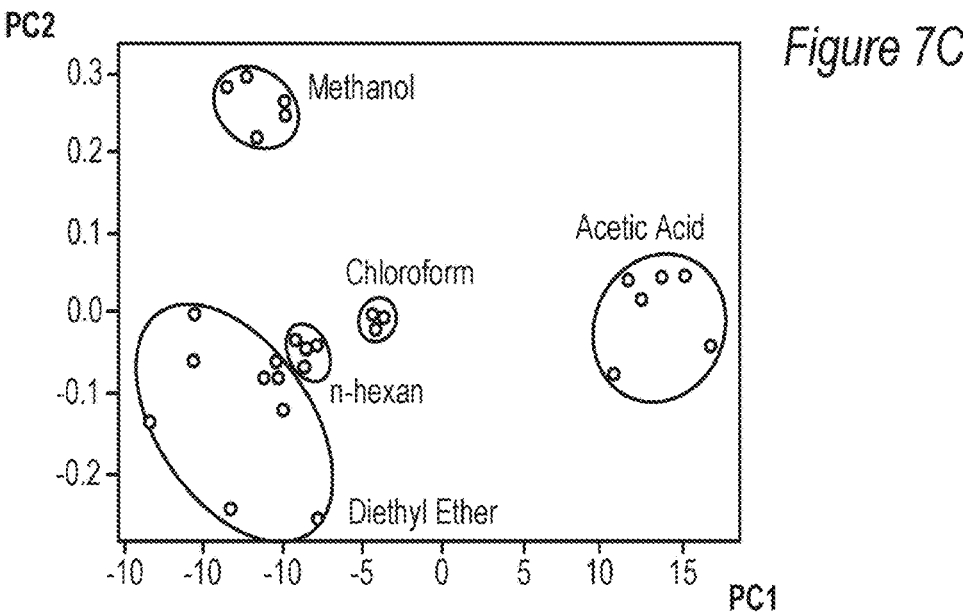
*Figure 7B*
*Figure 7C*
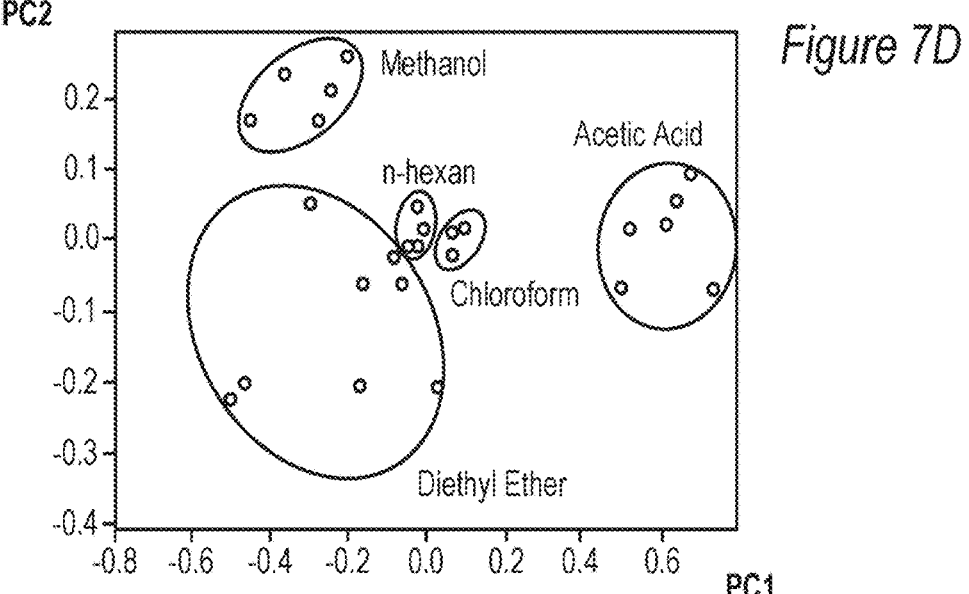
*Figure 7D*

Plastic (cuvette)

PDMS

Nitrocellulose (NC)

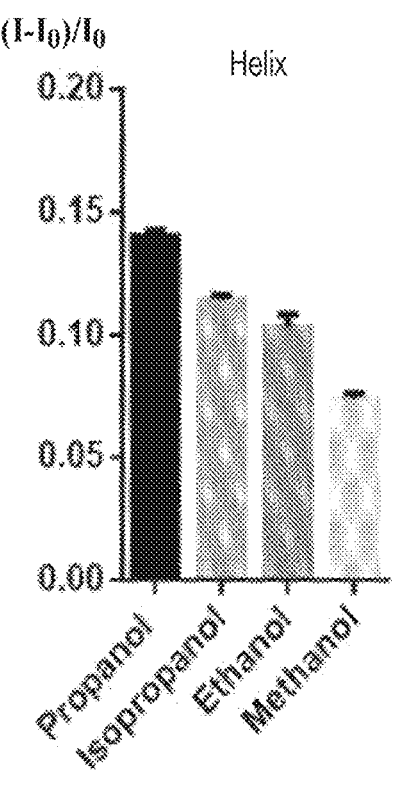
*Figure 12E*
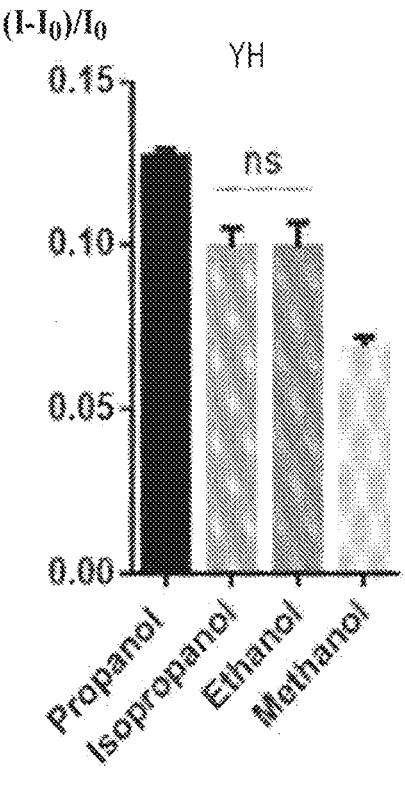
*Figure 12F*
*Figure 12G*
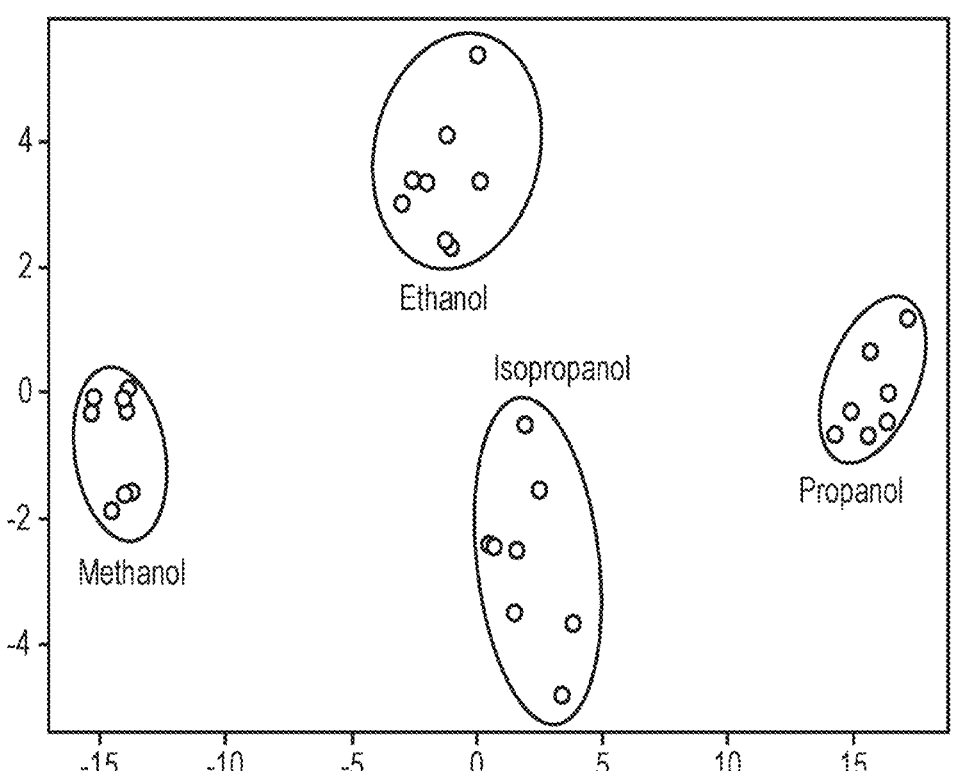

*Figure 13B*  Normal milk n=~25

| 1# | wfk | yh | wlk | wk | helix |
|---|---|---|---|---|---|
| 0.019 | 0.06 | 0.041 | 0.047 | 0.042 | 0.048 |
| 0.019 | 0.06 | 0.043 | 0.049 | 0.042 | 0.049 |

*Figure 13C*  Spoiled n=~25

| | | | | | |
|---|---|---|---|---|---|
| 0.017 | 0.055 | 0.041 | 0.044 | 0.039 | 0.045 |
| 0.018 | 0.056 | 0.04 | 0.044 | 0.039 | 0.046 |

WLK

Relative
intensity

Seconds tcDNA

Relative
intensity

Seconds

NANOSCALE OPTICAL BIOSENSOR BASED ON MATERIAL-ASSOCIATED SINGLE WALLED CARBON NANOTUBES

TECHNOLOGICAL FIELD

The invention generally concerns a nanoscale optical biosensor utilizing peptide encapsulated single walled carbon nanotubes.

BACKGROUND

Biosensors can be classified into three main groups depending on their associated method of signal transduction: electrochemical, optical and piezoelectric. Optical biosensors can be further classified as either label-based or label-free. The signal of label-free biosensors is generated directly from the interaction between the sensing element and the analyte, while the label-based approach requires additional elements to produce a signal. One of the advantages of optical biosensors is that the sensing element does not need to be physically attached to the signal processing system; thus, the signal can be sensed from a distance. The sensing element can also be easily replaced if the sensor degrades over time. Another notable feature of optical sensors is the ability to scale up the number of sensors (array) without requiring modification of any hardware elements. The camera registering the signal can simultaneously detect cues from a variable number of sensor dots.

Single-walled carbon nanotubes (SWCNTs) are one of the most promising materials for fluorescence-based biosensing. SWCNTs are cylindrical graphitic tubules with diameters of approximately 1.0 nm. In 2002, it was demonstrated for the first time, that semiconducting SWCNTs dispersed in aqueous solutions emit photoluminescence (PL) in the near-infrared region (NIR), with the exact PL wavelength depending on the chirality of the SWCNTs. For example (7,6) and (8,4) produce signal at about 1100 nm, (9,5) and (10,3) at 1250 nm while (6,5), (7,5) and (8,3) under 1000 nm. Detecting signal above 1000 nm could be expensive and more complicated; while detection below 1000 nm could be done with a simple silicon camera, which drastically reduces system cost.

It has been shown that both PL and electrical resistance are strongly influenced by changes in the local environment of the SWCNT. This feature renders nanotubes a powerful addition to a variety of optical and electrochemical biosensors for detection of proteins, DNA, RNA, bacteria, ions, small molecules and other analytes.

GENERAL DESCRIPTION

The inventors of the technology disclosed herein have developed a sensor device for sensing the presence of volatile molecules (VMs) (including volatile organic compounds (VOCs)) in gaseous samples, e.g., air, emitted from a variety of sources or present in a variety of environments, by utilizing NIR photoluminescence (PL) emitting material-wrapped or material-associated single walled carbon nanotubes (SWCNTs).

The material-wrapped SWCNTs enable specific recognition of the VMs. By interacting with the wrapping molecule or the SWCNT, the VMs can trigger changes in the PL of the SWCNT. The changes in the PL may result from a change in one or more different mechanisms, which are not fully understood. Without wishing to be bound by theory, these mechanisms may, for example, involve Fermi level shifting via redox-active analyte adsorption to the nanotube surface, quenching induced by exciton disruption in response to analyte binding, solvatochromic shifting due to perturbation of an SWNT-bound polymer, selectivity of analyte binding mediated by polymer wrapping, analyte-activated polymer switching; all triggering or resulting in modulated PL intensity and wavelength. These changes or modulations in the PL intensity or wavelength resulting from interaction of the SWCNT and/or the at least one material with the analytes are detected and analyzed.

Notwithstanding a particular mechanism of action, detection of VMs is rendered simpler and more effective as compared to existing methods of VMs detection. For example, in wine-making, bacteria originating from grapes, including *Acetobacter*, are inhibited during fermentation due to the lack of oxygen and presence of sulfur dioxide, but survive through the process and remain in the wine. They are tolerant of high ethanol concentrations and, in the presence of a small amount of oxygen, will produce acetic acid and ethyl acetate by consuming alcohol, resulting in wine spoilage. Therefore, during prolonged storage and aging of wine, it is vital to monitor levels of volatile acids in the barrels to allow for intervention before wine spoilage. The standard method used of measuring volatile acids is a steam distillation—a technique that, although accurate, is time-consuming, the equipment is bulky and requires skilled technicians, as well as a liquid sample of the wine. Moreover, considering the large number of barrels in most wineries, it is practically challenging to monitor each barrel using current methods.

The device of the invention is fully recoverable, real-time, NIR optical sensor that utilizes material-wrapped semiconducting SWCNTs (which may be a (6,5) SWCNT or a SWCNT of a different chirality) for the detection of VOCs such as acetic acid in wine aroma at room temperature or other environments. For example, application of such a device for wine spoilage detection by monitoring levels of acetic acid exceeding 1 g/L in red wine, using a silicon camera, is demonstrated.

In a first of its aspects, the invention provides an optical sensor device for determining presence of at least one volatile compound (VC) in a gaseous environment, the device comprising a light responsive surface comprising a material-wrapped single walled carbon nanotube (SWCNT), the device being configured and operable for allowing interaction between the at least one VC in the gaseous environment and the SWCNT and/or the material wrapping same; and for emitting NIR photoluminescence indicative of said interaction.

Also provided is a sensor device comprising a light-responsive surface associated with one or more material-wrapped single walled carbon nanotube (SWCNT), the device being configured and operable for emitting a NIR photoluminescence indicative of an interaction between the VCs and the SWCNT and/or the material wrapping same.

Further provided is a photoluminescent sensor device for detecting a change in a gaseous environment of a material-wrapped SWCNT, the change being derived from an interaction between at least one VC and the SWCNT and/or the material wrapping same.

The sensor device of the invention is typically operable in a dry state, namely wherein the surface of the device is substantially water-free or the device is operated in a substantially dry form, e.g., not immersed in water or not under humid conditions. As a person of skill would appreciate, in a method of manufacturing the device, the deposition of the SWCNT and at least one material (in the form of a complex)

is achieved while the complex is in solution. Drying of the medium after deposition results in a substantially water-free or a substantially dry device; the device thus being capable of detecting volatiles in the gaseous state.

As used herein, the term "substantially dry" or "substantially water free" refers to a state that is free of water, but which nevertheless can contain a certain amount of natural water that may be present in form of humidity originating in the device environment or water that is bound to the device surface or device features and which is difficult to remove even under the most stringent conditions. The terms encompass any state of dryness that is achieved by thermally treating the sensor device to remove water or achieved by flowing air at the device surface. In some embodiments, the terms refer to a state that is 100, 99.5, 99, 98.5, 98, 97.5, 97, 96.5, 96, 95.5, 95, 94.5, 94, 93.5, 93, 92.5, 92, 91.5, 91, 90.5 or 90% water free or dry.

In some embodiments, dryness also applies to the absence of other solvents which may be used in the manufacturing process of the device. Same rules as above apply also to solvents that are not water.

The term "gaseous environment" refers to a sample, as defined, which may be the environment surrounding the sensor device, that contains the volatile compound(s) in a gaseous state. In other words, when measured, the volatile compound(s) is not tested when dissolved in a solvent. In some applications, the sensor device of the invention may be utilized in a sample obtained from a water-containing environment, i.e. humidity. Such measurements are within the scope of the present application. Putting it differently, the gaseous environment refers to the natural environment of the volatile compound. For example, where the device is used for the detection of toxic materials emitted from sewage, the gaseous environment is regarded as the air volume above a sewage opening or a sample obtained from the environment within or surrounding the sewage. By another example, where the device is used for the detection of volatiles present in a breath sample of a subject, the exhaled air is the environment in which the gaseous volatile is to be detected.

In some embodiments, the VC is at least one volatile organic compound (VOC), as defined herein.

Devices of the invention are "optical sensor devices" or "photoluminescent devices". Each of the devices comprises or is constructed of a light sensitive area (being in the form of a light responsive area) in the form of a material-entrapped SWCNT, as disclosed herein, associated with a surface. The light-responsive area is configured to generate an output signal. As will be further outlined in detail below, the optical sensor or each optical sensor in an array of devices may be embodied such that precisely one light-responsive area is present in the respective optical sensor, such as by providing precisely one light-responsive area which may be illuminated, in response to which illumination precisely one uniform sensor signal is created for the whole optical sensor. Thus, each optical sensor may be a single area optical sensor. In other embodiments, an optical sensor device may comprise two or more light-responsive areas. Thus, each sensor device may comprise a matrix of optical sensors, constituting a pixelated optical device.

Specifically, the optical sensor devices are sensitive in the NIR infrared spectral range. The optical sensors comprise one or more SWCNT that are sensitive in the infrared spectral range ranging between 950 nm and 2000 nm. The exact wavelength depends on the chirality of the SWCNTs. For example (7,6) and (8,4) produce signal at about 1100 nm, SWCNT (9,5) and (10,3) at 1250 nm, while SWCNT (6,5), (7,5) and (8,3) at 1000 nm; and thus the sensitivity of the device may vary.

The optical sensor device is not an electronic device or is not an opto-electronic device.

The optical sensor device of the invention is a VOC sensor which may be used as a single device or in an array, typically at room temperature, such that VOCs interacting with the sensor do not volatilize, rendering the device extremely stable. The operation of the device is discussed further hereinbelow.

The invention also provides an array of sensor devices according to the invention. The array may comprise a plurality of sensor devices for simultaneous sensing of multiple volatile compounds or mixtures thereof.

In some embodiments, each of the sensor devices is configured to undergo regeneration of functional recovery between uses. The regeneration or functional recovery may comprise flowing air over the device surface and/or comprise thermal treatment. The thermal treatment may comprise heating the device surface, optionally by a means selected from irradiation by UV or IR, or by direct surface heating.

The "material-wrapped SWCNT" (herein also referred to as a material-SWCNT complex) is a complex or an association or a composite of a SWCNT and at least one material, which renders the SWCNT dispersible in water. The at least one material, based on its chemical or physical characteristics has at least one point of association with the SWCNT. It may be wrapped around the SWCNT or have one or two or more points of interaction with the SWCNT. Notwithstanding, the complex, association or composite is not a mere mixture of the two material entities, but rather a different chemical entity from either individual entity. The at least one material is selected amongst such materials capable of interacting with the SWCNT via any chemical association. In some embodiments, the association is covalent association. In other embodiments, the association is not covalent association. In some embodiments, the material is selected amongst any such material capable of intermolecular interaction, such as π-π stacking, H-bonding, ionic bonding, van der Waals interactions, and others as known in the art.

Depending on such considerations as (i) length of the at least one material and/or the SWCNT, (ii) nature of the at least one material (e.g., hydrophobic, hydrophilic, bulkiness, chiralty etc) and/or the SWCNT, (iii) composition of the at least one material, (iv) whether the at least one material is provided alone or in combination, and others; the complex or association between the at least one material and the SWCNT may be regarded as a binary complex, wherein one material molecule interacts with one SWCNT or a complexes in which a multiple number of material molecules, same or different, interact with a single SWCNT. As the number of material molecules undergoing interaction with a single SWCNT is difficult to control and asses, and as such a number has no effect on the sensitivity of the sensor nor its functionality, the number of molecules actually interacting with the SWCNT is of no importance, provided that one or more such molecules do associate with the SWCNT.

Without wishing to be bound by theory, based on the methods used for the formation of the complex, it is believed that multiple material molecules, same or different, interact with each single SWCNT.

As stated above, the at least one material may be selected amongst any material known to interact with a SWCNT of any chirality, length or composition. The at least one material may be selected amongst proteins, polymers, peptides, nucleic acids, ionic, cationic, nonionic and zwitterionic surfactants, amphiphilic macromolecules, block copolymers, organic solvents or other molecules that provide a dispersion of SWCNTs.

The selection of an appropriate material will direct the type of bonding or association the material and the SWCNT form. Where non-covalent binding is selected in order not to compromise the physical properties of SWCNT, charged materials such as peptides and ionic surfactants, e.g., sodium cholate, sodium dodecylsulfate (SDS), sodium dodecylbenzene sulfonate (NaDDBS) and others, may be used. Wrapping of these materials as well as of polymers, involves interaction between the charged groups or aromatic groups on main chain or pendent groups on the polymer with the SWCNT skeleton. The polymers may include polyvinyl pyrrolidone (PVP), polyvinyl alcohol (PVA), polystyrene sulfonate (PSS) and others.

Peptides and nucleic acids (such as DNA and RNA) of various lengths, compositions and structures may also be used. Their interaction with the SWCNT may be similar to interactions observed in the case of ionic materials or via aromatic or n segments on the peptide or nucleic acid structure.

The peptide may be any such peptide, as known in the art, and may optionally selected from peptides comprising at least one aromatic amino acid, and/or a peptide having a helix form.

In some embodiments, the peptides, polymer, DNA or surfactant selected used in forming a complex with a SWCNT according to the invention, is any one or more of the molecules herein designated (i) through (xiii): (i) Hex-Coil-Ala: AEAESALEYAQQALEKAQLALQAAR-QALKA; (ii) TNTP: ARGYSSFIYWFFDFC; (iii) MMP: YKYKYKGGPAALVGGAD; (iv) #1: IFRLSWG-TYFSDNPIQAVP; (v) #2: KSDSKSDSIFRLSWGTYFS; (vi) WK: Random WK-20: $[(W)_{0.5}-(K)_{0.5}]_{20}$; (vii) YK: Random YK-20: $[(Y)_{0.5}-(K)_{0.5}]_{20}$; (viii) WLK: Random WLK-20: $[(W)_{0.33}-(L)_{0.33}-(K)_{0.3}]_{20}$; (ix) WFK: Random WFK-20: $[(W)_{0.33}-(F)_{0.33}-(K)_{0.33}]_{20}$; (x) tcDNA: TCTCTCTCTCTCTCTCTC; (xi) PVA polymer; (xii) SC: Sodium cholate; (xiii) SDS: Sodium dodecyl sulfate.

Unlike non-covalent bonding, covalent binding involves functionalization of the SWCNT is a way that will not compromise its function and usability. As known in the art, there are several approaches for functionalization of SWCNTs. Any of the known methods may be utilized to provide covalent association between the at least one material and the SWCNT.

In some embodiments, however, functionalization of the SWCNT may be required not for the purpose of enabling covalent interaction with the at least one material, but rather to strengthen or support or enable non-covalent interaction therewith. For example, functionalized SWCNTs can produce strong non-covalent association with many polymers.

In accordance with the invention, SWCNTs are utilized. These SWCNTs are typically between 0.4 and 40 nm in diameters. The lengths of the SWCNT may range from 0.14 nm to 5.5 cm Each SWCNT is defined by using a (n, m) scheme derived from a chiral vector that is as OA=na 1+ma 2, where a 1 and a 2 are unit vectors for the hexagonal lattice of the graphene sheet, n and m are integers, along with a chiral angle θ, which is the angle of the chiral vector with respect to the x direction. The SWCNTs utilized according to the invention are regraded chiral, namely having an n value that is different from m, and m is also different from zero. In some embodiments, the SWCNTs are selected amongst chiral semiconductor SWCNTs having (n, m) values selected from (1,0), (2,0), (4,0), (5,0), (7,0), (8,0), (10,0), (11,0), (13,0), (14,0), (16,0), (2,1), (3,1), (5,1), (6,1), (8,1), (9,1), (11,1), (12,1), (14,1), (15,1), (3,2), (4,2), (6,2), (7,2), (9,2), (10,2), (12,2), (13,2), (15,2), (4,3), (5,3), (7,3), (8,3), (10,3), (11,3), (13,3), (14,3), (5,4), (6,4), (8,4), (9,4), (11,4), (12,4), (14,4), (6,5), (7,5), (9,5), (10,5), (12,5), (13,5), (7,6), (8,6), (10,6), (11,6), (13,6), (8,7), (9,7), (11,7), (12,7), (9,8), (10,8), (12, 8), (10,9) and (11,9). In some embodiments, the SWCNT is any one of (1,0), (2,0), (4,0), (5,0), (7,0), (8,0), (10,0), (11,0), (13,0), (14,0), (16,0), (2,1), (3,1), (5,1), (6,1), (8,1), (9,1), (11,1), (12,1), (14,1), (15,1), (3,2), (4,2), (6,2), (7,2), (9,2), (10,2), (12,2), (13,2), (15,2), (4,3), (5,3), (7,3), (8,3), (10,3), (11,3), (13,3), (14,3), (5,4), (6,4), (8,4), (9,4), (11,4), (12,4), (14,4), (6,5), (7,5), (9,5), (10,5), (12,5), (13,5), (7,6), (8,6), (10,6), (11,6), (13,6), (8,7), (9,7), (11,7), (12,7), (9,8), (10,8), (12,8), (10,9) or (11,9).

In some embodiments, the SWCNT is (6,5).

Thus, sensor devices of the invention utilize a complex or an association or a composite of at least one material, as defined herein, and at least one chiral and semiconducting SWCNT.

In some embodiments, the association between the at least one material and the SWCNT is non-covalent.

In some embodiments, the SWCNT is (6,5).

In some embodiments, the at least one material is a peptide. In some embodiments, the peptide is any one of the peptides herein designated (i) through (xiii).

In some embodiments, the at least one VC is a mixture of volatile compounds identified based on their influence on the photoluminescence of the SWCNT and/or the material wrapping same following interaction with the mixture of VC. As explained herein, as the invention is capable of identifying a VC profile or a fingerprint that enables distinguishing between two VC statuses, e.g., prior to interaction of a volatile with the responsive surface and after the interaction occurs, the exact identity of the VC interacting with the responsive surface is of a lesser important. In fact, for achieving a desired detection and analysis, the identity of the VC(s) need not be known.

Sensor devices of the invention are formed by depositing a dispersion comprising a material-SWCNT complex on a surface region suitable for such devices. The deposition may be achieved by utilizing any of the deposition methods known in the art. Such deposition methods may involve printing, e.g., hand drop, ink-jet printing, deposition using liquid handler or modified 3D printer. Electric or magnetic field induced orientation methods may also be used in order to orient the SWCNT parallel to the surface.

Thus, in another aspect, there is provided a method for fabricating a sensor device of the invention, the method comprising depositing a dispersion of a material-SWCNT complex, according to the invention, to a surface region of a substrate, under conditions permitting association of the complex to the surface.

In some embodiments, the method comprises obtaining a dispersion of the complex. The dispersion is typically an aqueous dispersion, i.e., comprising or consisting water as the medium. The dispersion may be obtained by any means known in the art. In some embodiments, the dispersion is formed by mixing the at least one material and SWCNT under conditions permitting association of the material to the SWCNT.

In some embodiments, the method comprises
obtaining a dispersion of a material-SWCNT complex, as defined herein; and depositing said dispersion onto a surface region under conditions permitting association of the complex to the surface.

The deposition may involve any of the deposition methods known in the art, as disclosed hereinabove, under conditions involving:

deposition at room temperature (a temperature between 25-30° C.) or at a temperature between room temperature and 100° C. or at a temperature below 25° C.;

drying conditions enabling association of the complex to the surface and evaporation of the dispersion medium.

As noted hereinabove, devices of the invention are substantially dry devices and operate under water-free conditions, as defined. Thus, the step of drying of the surface to permit association of the complex to the surface is an important step, in some embodiments. Drying of the deposited dispersion liquid medium, mainly from water, may be achieved by any means known in the art. In some embodiments, drying may involve conditions of evaporation of the dispersion liquid medium by thermal treatment or by flowing a gas over the region of material deposition. Following evaporation the surface is substantially free of the dispersion liquid medium, e.g., water, or any other solvent or liquid component that is present. A substantially water free or a substantially dry device or surface is thus obtained that can be used in accordance with the invention.

In some embodiments, the surface on which the complex is deposited may be selected from plastics, polymers, glass, nitrocellulose, paper substrates, metallic surfaces and others, as disclosed herein. In some embodiments, the surface is pretreated prior to deposition.

In some embodiments, deposition is manual or involves, comprises or consists inkjet printing.

The substrate onto which the sensor device is formed may be of any material. Typically, a substrate material is considered suitable where the substrate permits association of the complex thereto and provided that it does not have an effect on the optical properties of the SWCNT. In some embodiments, the substrate may be of a material selected from metallic material, conductive materials, insulator materials, semiconducting materials, glass and glass composite materials, polymeric materials, silicon-based materials such as PDMS, nitrocellulose membrane and paper products such a Whatman paper.

Each of the substrates may comprise one or more sensing regions, e.g., forming a pixelated surface or an array, as disclosed herein, wherein each of the pixels (namely each of the sensor devices) may comprise a different complex, a different arrangement of complexes, a different surface density of the complexes, etc.

Such pixelated or array structures are exemplified herein, wherein examples demonstrate use of different complexes, e.g., use of different peptides, different surfaces (see for example FIGS. 10A-C), and different assaying conditions, e.g., different chamber temperatures (FIGS. 15A-B), different speed flow in the chamber and different humidity in the chamber (see for example FIG. 12). Other features of the technology as well as any of the other assaying conditions may be modified in order to obtain a functioning device of high sensitivity and selectivity.

The invention further provides a system comprising a plurality of sensor devices according to the invention. As explained herein, each of the material-SWCNT complexes is as a photoluminescent material capable of absorbing an incident radiation from a radiation source and emitting an emitted radiation having a spectral signature with a decay time after removal of the radiation source. Thus, a system of the invention further comprises at least one radiation source configured to provide the incident radiation directly proximate to the photoluminescent material and a camera configured to measure the emitted radiation directly proximate from the photoluminescent material at predefined time intervals during the decay time.

The spectral signature includes spectral intensities for a first wavelength and optionally a second wavelength at a first time in the decay time and spectral intensities for the first wavelength and optionally for the second wavelength at a second time in the decay time, such that a change in the spectral intensities and/or the wavelength is indicative of a change or a modulation in the PL of the SWCNT. The intensities measured at a first time in the decay time may be at a time prior to exposure of the device to the VCs and the second time being a time after exposure. A change between the first and second time points provides an indication of a VC profile.

A system may further comprise means configured to communicate with an application to report and record a change in the PL and a change in the VC profile.

Thus, in another aspect, there is provided a system for monitoring a change in an air sample, the system comprising one or more sensor devices according to the invention for sensing the presence or a change in an amount of volatile compounds (VCs) over time; each of the one or more sensor devices comprising one or more material-SWCNT complex according to the invention;

at least one radiation source configured to provide an incident radiation directly proximate to the one or more sensor devices or the one or more material-SWCNT complexes;

a camera configured to measure emitted radiation directly proximate from the one or more sensor devices or the one or more material-SWCNT complexes at predefined time intervals during the decay time;

a computer system comprising a data processing utility comprising an input interface configured and operable for receiving data comprising a plurality of sensing signals independently received from the one or more sensor devices or the one or more material-SWCNT complexes via a computer network; and a data analyzer comprising an analyzer module configured and operable for extracting from the sensing signals one or more VC-related signatures and identifying (from the one or more VC-related signatures) a volatile emitting status corresponding to the change to be monitored.

As used herein, the 'volatile emitting status' corresponding to the change to be monitored relates to a change in the status of a gaseous sample over time. The gaseous sample may be any such sample that spontaneously evolves from a product or a material status, a sample of air exhaled from a subject, a component extracted or excreted into a gaseous environment, e.g., air surrounding the product, and others. Where the gaseous sample is an exhaled air, a change over time may be indicative of a disease early stage or generally a change in the subject's health condition. Where the gaseous sample is the air surrounding a product such as an organic product, a change is indicative of the quality of the product (freshness, stage of decomposition etc). Where the gaseous sample is of volatile acids in wine barrels, a change may be indicative of wine spoilage.

The volatile emitting status may be determined based on a VC profile obtained at the time of measurement as a change from a control VC profile that is indicative of a 'normal' marketable quality product (i.e., as measured at the time of initial measurement). A change in the VC profile may be any change in the PL spectrum of the measurement indicative of a "not normal" state, namely a state of decomposition, illness etc, depending on the particular use of the device, as disclosed herein.

The VCs to be detected may be any one or more volatile materials that are generated by the product or the environment or are excreted or evolved in the environment. The "VC profile" refers to a volatiles signature, namely to a collection of properties relating to the VC content of a VC quanta or volume in contact with the sensing units. These collective properties are unique and informative, thus may be regarded as a fingerprint or a signature indicating onset, evolution or progression of a change. In some cases, the VC profile may be distinguishable or characterized based on the presence of a single VC or single property, as defined. In other cases, the VC profile is distinguishable or characterized based on a difference(s) from a prior pattern obtained, e.g., at an earlier time point, or from a pattern obtained for a control sample, as explained herein. Such a change in the pattern of the emitted VC or composition thereof does not require prior identification or characterization of the VC or composition exhibiting the particular pattern.

As will be detailed below, pattern recognition (e.g., for distinguishing or differentiating or identifying changes between two obtained patterns) may utilize suitable statistics, and algorithms or machine learning (deep learning, image recognition, etc).

As a person of art would recognize, VCs are a major component of odors. VCs, as categorized by the World Health Organization, are compounds with a boiling point less than 250° C. measured at a standard atmospheric pressure, thus they easily evaporate into the environment. Almost every day aspect of human activity, including driving, cooking, breathing, and a wide range of consumer and personal care products, also releases enormous variance of VCs such as carbonyls, alcohols, alkanes, alkenes, esters, aromatics, ethers, and amides to the atmosphere. A major part of the produced VCs is considered to be a hazard; it impacts the air quality and becomes a huge environmental concern that affects human health with both short- and long-term impacts. Thus, detection of VCs utilizing devices and systems of the invention may be for diseases diagnostics, quality control, insect monitoring, homeland security and environment protection.

The invention further provides a nose for detecting presence of volatile molecules in air and identify source of the volatile molecules, the nose comprising at least one sensor device of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 2A-F show PL optical profile of the drop dried SWCNTs/YK sensor in different temperatures; 20° C. (FIG. 2A, B), 60° C. (FIG. 2C, D), and 95° C. (FIG. 2E, F). The insert is a sensor image as it was taken during the experiment.

FIGS. 3A-D show custom optical setup. FIG. 3A) preparation of SWCNTs/Peptide suspension and drop drying.

FIG. 3B) Representative image of PL of the sensor as it seems with the camera. FIG. 3C) The 'static' method where the analyte is introduced to the bottom of the close cuvette. FIG. 3D) The 'dynamic' method where air passes above analyte before reaching the SWCNTs sensor.

FIG. 4A) Comparison of the response of 5 different sensors toward the vapor of and 0.4% (v/v) acetic acid solution. FIG. 4B) Spectral response of the SWCNTs/YK sensor toward vapor of a 0.05% (v/v) solution. FIG. 4C) Dynamic response of YK sensors to different concentrations of acetic acid vapor (0.05% (v/v) solution to 3.2% (v/v)). n=3, dashed lines represent standard deviation. FIG. 4D) A semi-logarithmic graph presenting dependence of PL on acetic acid concentration. Error bars represent standard deviation.

FIGS. 6A and C; Kinetics. FIGS. 6B and D the change in the intensity 90 s after wine injection. Error bars and dashed lines represent standard deviation. Wine A; n=12, p=0.0017. Wine B; n=8, p=0.0001 (Unpaired t test).

FIGS. 7A-D show VOC screening in the gas phase against six sensors. FIG. 7A) response of the sensors to each analyte, FIG. 7B) a heat map representation of the reaction of 6 sensors toward five analytes. FIG. 7C) PCA with all six sensors FIG. 7D) PCA with only YK and TNTp sensor.

FIG. 8A: Plastic FIG. 8B: PDMS FIG. 8C: Nitrocellulose paper.

FIG. 9A: PDMS FIG. 9B: Nitrocellulose FIG. 9C: Plastic FIGS. 10A-D demonstrate response of peptide-encapsulated SWCNT sensors to ethanol vapor. FIG. 10AB) The WFK sensor response to 216 ppm, 290 ppm, 309 ppm, 354 ppm, and 392 ppm ethanol in the airflow. The red line represents a commercial semiconductor sensor (MQ3) response, which served as a control (n=3).

FIGS. 12A-G presents the optical response of the sensor to five alcohols 10% v/v solutions; ethanol, methanol, propanol, and isopropanol. FIG. 12A) Two hours experiment where each peak represents changes in PL after reaction to one of the analytes following by recovery with clear air. FIGS. 12B-F) A summary of the relative PL change of the sensors after reaction to each analyte. Data are presented as mean. Error bars represent standard deviation. n=8. P<0.05 unless otherwise indicated. FIG. 12G) LDA of peptide-encapsulated SWCNTs sensors PL responses to 10% v/v analytes solutions.

FIGS. 13A-C demonstrate the use an array of 6 sensors to distinguish between spoiled milk (7 days past date) versus freshly opened one. FIG. 13A: represent a PCA analysis. FIG. 13B and FIG. 13C a heat map of the response. The aroma of the milk (gaseous phase) where pushed above the sensors.

FIG. 14A: response of 4 sensors (WK, WLK, WFK, HELIX) toward vapor of 10% Ethanol, Methanol or Propanol. FIG. 14B: same sensors and analytes, but without cooling—room temperature of 21° C.

FIGS. 16A-D) A one-hour experiment where each peak is representing the change in Hz after the passage of analyte vapor, followed by the passage of clear air. FIGS. 16E-H) A summary of the change in frequency of each of the sensors after exposure to each of the four analytes. Error bars represent standard deviation. n=4. P<0.05 unless otherwise indicated. FIG. 16I) LDA.

FIG. 20D) A summary of the relative PL change of the sensors after reaction to Beer, Wine, or Vodka. Data are presented as mean. Error bars represent standard deviation. n=16. P<0.05 unless otherwise indicated. FIG. 20E) LDA of the response of the sensor.

FIG. 21A) LDA and FIG. 21B) Heat map presentation of the photoluminescence changes of the sensors upon exposure to limonene, geraniol and undecanal.

DETAILED DESCRIPTION OF EMBODIMENTS

Chemicals and Reagents

Figure 1:
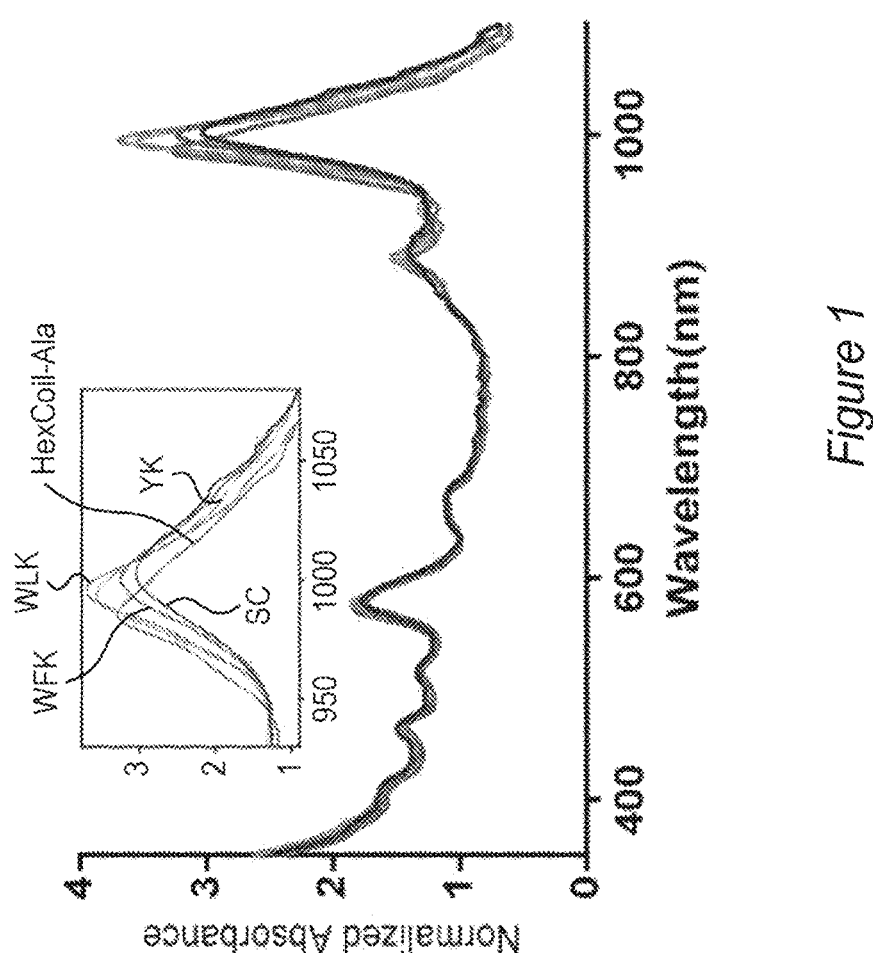
FIG. 1 provides UV-vis absorbance spectra of peptides or SC-encapsulated (6,5) SWCNTs. The insert presents a 950 nm-1050 nm part of the spectrum

Fmoc-AA-OH, 2-(1H-benzotriazole-1-yl)-1,1,3,3-tetramethyluronium hexa fluorophosphate (HBTU) and rink amide resin (0.53 mmol/g) were purchased from Chem-Impex (USA). N,N-dimethylformamide (DMF), diethyl ether, trifluoroacetic acid (TFA), N, N-Diisopropylcarbodiimide (DIC), N,N-diisopropylethylamine (DIEA) and Oxyma Pure were purchased from Biolab, Israel. Polystyrene cuvettes were ordered from Kartell™.

Peptide Synthesis

The HexCoil-Ala peptide was synthesized on the CEM Liberty Blue™ Automated Microwave Peptide Synthesizer on a 0.10 mmol scale, using rink amide resin (Chem Impex International Incorporated, USA) according to the manufacturer's instructions.

Briefly, 10% w/v piperazine was used as the Fmoc-deblocking reagent. Post-deprotection washing with DMF was followed by coupling, using a 4-fold excess of Fmoc-AA-OH (0.2 M in DMF), DIC and Oxyma Pure. Upon completion of the synthesis, the peptide was cleaved from the resin by a 3 h incubation, with stirring, in a solution containing 95% (v/v) TFA, 2.5% (v/v) water, and 2.5% (v/v) triisopropylsilane. The peptide was then precipitated from the solution by the addition of cold ether, and harvested by centrifugation (4° C., 5000 rcf). Ether was removed, and the pellet was dried under a nitrogen stream, frozen in liquid nitrogen, and lyophilized. The synthesis was validated by MALDI-TOF mass spectrometry.

A random mixture of peptides YK, FLK, WLK, WFK was synthesized on MARS VI multimode microwave. Coupling reactions were conducted with binary combinations of L-Fmoc-protected amino acids (Chem Impex, USA). A stock solution containing the protected amino acids in defined proportions and stereochemistry was freshly prepared for each coupling step. Before coupling, an aliquot containing four equivalents (100 μmol) of the amino acid mixture was activated with four equivalents of HBTU and eight equivalents of DIEA in DMF. The activated amino acid solution was then added to the solid-phase synthesis resin, and the reaction mixture was heated to 70° C. in a MARS VI multimode microwave (2-min ramp to 70° C., 4-min hold at 70° C.), with stirring. Fmoc deprotection was achieved by adding 20% piperidine in DMF and heating the solution to 80° C. in the microwave (2-min ramp to 80° C., 3-min hold at 80° C.), with stirring. After each coupling/deprotection cycle, the resin was washed three times with DMF.

Preparation of Peptide-Encapsulated SWCNTs

Seven peptide/SWCNTs suspensions were prepared. Briefly, individual peptides and SWCNTs (CoMoCAT™ Signis® SG65, Sigma) were mixed (1:1 mass ratio) in DW using a one-eighth-inch probe-tip sonicator at 10 W, for 20 min. For the suspension of SWCNTs with sodium cholate (SC) a 1 w/v % SC suspension was prepared and sonicated with SWCNTs for 1 h. The resulting solution was centrifuged twice for 40 min at 16,000×g, and the pellet was removed each time. The SWCNT concentration was calculated from the absorbance at 632 nm, using Beer-Lambert law with the extinction coefficient, $\varepsilon_{632}=0.036$ L mg$^{-1}$ cm$^{-1}$.

Figures 3A, 3B, 3C, 3D:
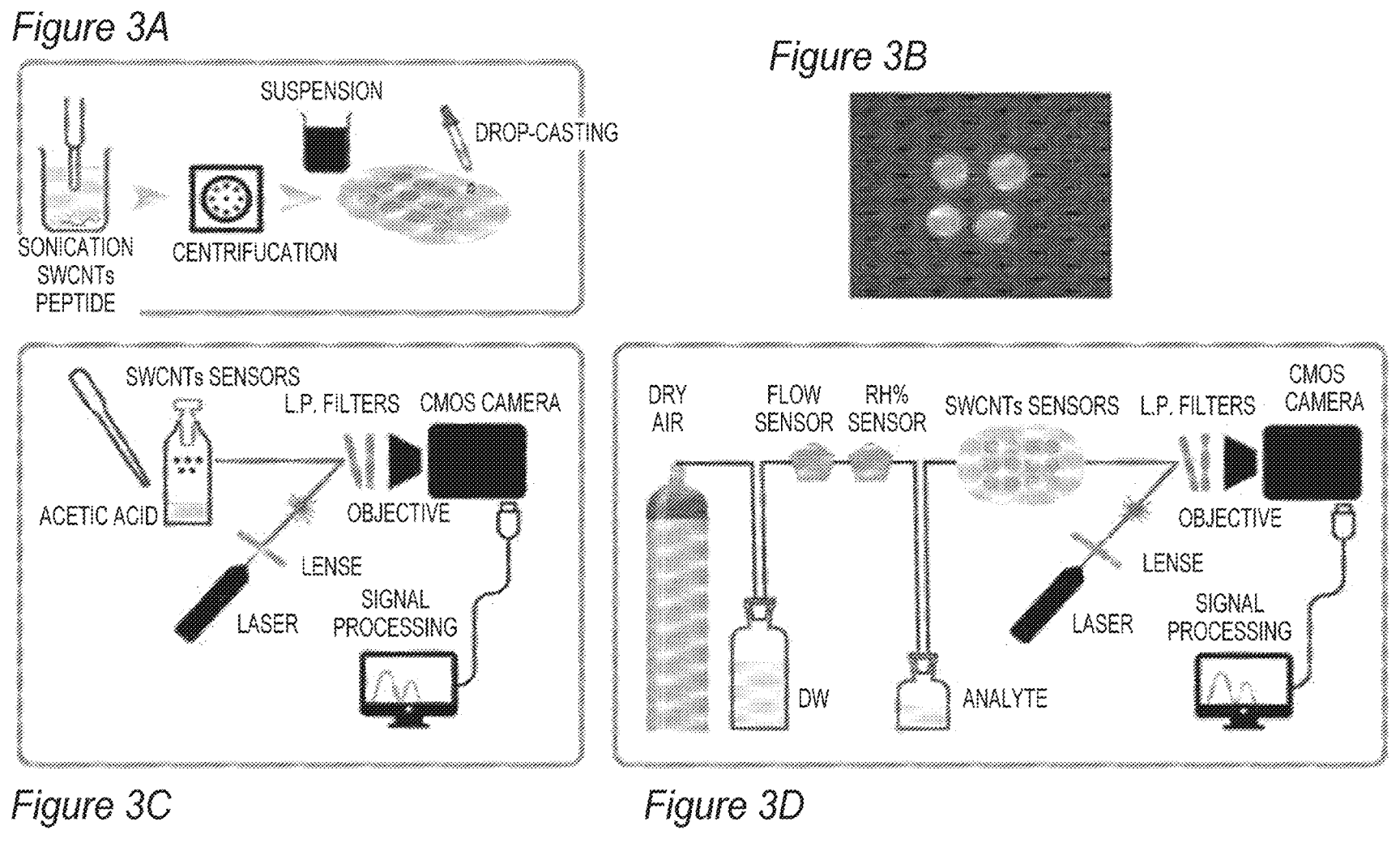

Sensor Preparation 0.5 μl drops of SWCNTs/peptide suspension (concentration of 10 mg CNT per liter) were drop-casted side by side on a polystyrene cuvette (For static method) or on 60 mm Petri dish (for dynamic method), which were then dried under 95° C. for 90 see, or under 20° C. and 65° C. until the drop was completely dry (FIG. 3A-B). Each drop contained different SWCNTs/peptide suspension. Drying was performed on aluminum block in a closed oven with ventilation. A custom-made PDMS chamber was prepared and placed on top of the Petri dish with inlet and outlet tubes for gas flow experiments.

Analyte Screening

A custom setup was constructed for SWCNTs PL measurements (FIG. 3). The change in PL emission of the peptide/SWCNT sensors was recorded continuously using a XIMEA CMOS camera with 900 nm and 750 nm long-pass filters (Thorlabs), a 532 nm laser (100 mW output, PGL-V-H-532 CNI) was used for excitation. The signal proceeded with custom-built Python software (XIMEA API, Anaconda distribution, and OpenCV library) that analyzed PL intensity changes in each sensor separately. 2D and 3D PL profiles were analyzed using Fiji ImageJ distribution and the Interactive 3D Surface Plot plugin.

Before each experiment, all sensors were allowed to achieve a steady-state for 10 min, under 100 mW laser excitation. For the experiments, static and dynamic methods were used. In a static method, 200 ul of liquid analyte was introduced to the bottom of the cuvette (FIG. 3C), while in the dynamic method clear air flew above the analyte in a bottle before entering the chamber (FIG. 3D). The relative humidity in the flow tube was measured with a TFA 30.5013 Hygrometer before entering to the analyte chamber and was maintained between 44% to 55%.

The PL spectrum of a drop-casted YK sensor was measured using an inverted NIR fluorescence microscope coupled to a nitrogen-cooled InGaAs detector through an Acton SP2500 spectrometer (Princeton Instruments).

A UVATA UPSUV311 system with a UPH56 365 nm LED head and a UPUL006 lens with illumination power of 6000 mW/cm$^2$ (according to manufacturer's specifications), was used to recover the YK sensor from acetic acid.

For wine tests, a static method and two local wine brands were used. The wine was used intact, or with addition of 0.5 g/L Acetic acid (Sigma), that was added to the wine directly before the experiment. 200 ul Of wine was injected to the bottom of the cuvette, and a sensor's response was recorded immediately after the addition.

Results and Discussion

Peptide Library Screening

Seven peptides (listed in the specification) were synthesized and tested for their ability to create a stable suspension of (6,5) peptide-encapsulated SWCNTs in distilled water (DW). To potentially improve acetic acid binding to the sensor, five out of seven peptides were designed with a positive charge. For the random peptides, the charge was calculated according to the average of major components; YK*(+11), WLK*(+8), FLK*(+7), WFK*(+7), YK5(+4). Peptides were synthesized on amide resin to avoid an acid terminal. HexCoil-Ala (0), YE5 (−2), and SC served as a control. For the synthesis of random peptides, a technique previously used for development of antimicrobial agents, which involved incorporation of a mixture of amino acids in a defined proportion at each coupling step, was used. This results in a mixture that contains up to 2$^n$ (for two types of amino acids) or 3$^n$ (for three types of amino acids) sequences, where n is the number of the coupling step, of random peptides with defined composition, stereochemistry, and controlled chain length. This approach leads to a high number of different peptides, thus enhancing the chances for a sensitive and strong biosensor response. All peptides, except HexCoil-Ala, were rich in aromatic amino acids (phenylalanine, tryptophan, and tyrosine) to enhance their binding to SWCNTs via π-π interactions.

Among the seven tested peptides, four successfully encapsulated (6,5) SWCNTs; YK, WLK, WFK, and Hex-Coil-Ala (FIG. 1). The suspensions were found to be stable for at least four months of storage at 4° C. FLK failed to suspend (6,5) SWCNTs but efficiently suspended (7,6) SWCNTs. Thus, phenylalanine may be unsuitable for (6,5) SWCNTs dispersion under the tested conditions. Short, five-amino acid peptides (YK5 and YE5) failed to disperse both (6,5) and (7,6) SWCNTs.

Sensor Preparation

Figure 2E:
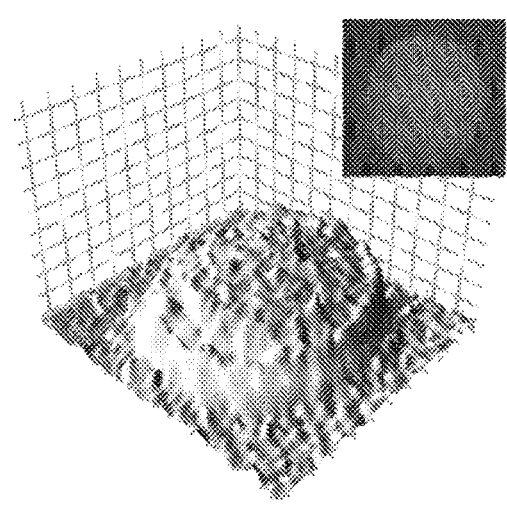
Figure 2F:
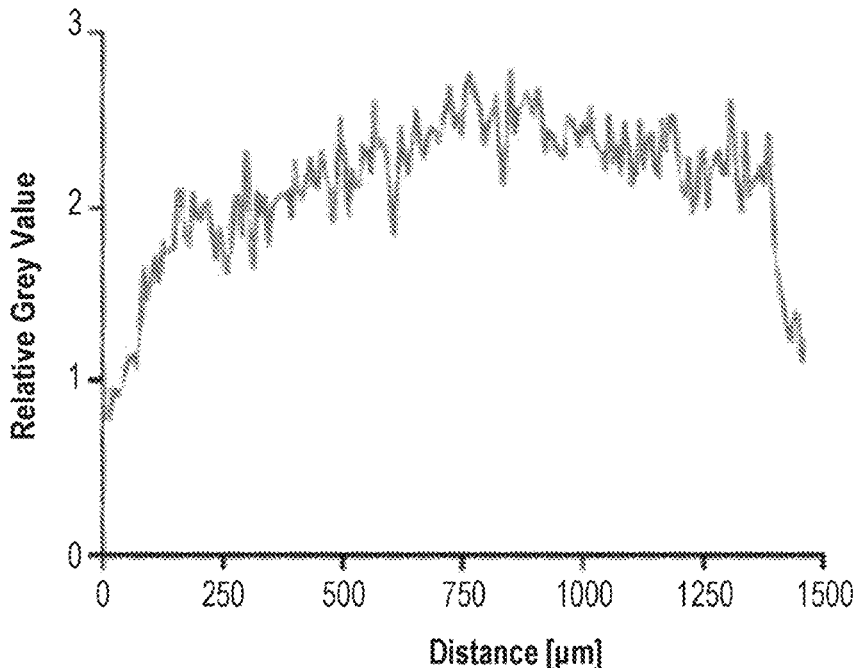

SWCNTs/peptide suspensions were drop-cast onto the sidewall of polystyrene cuvettes and dried in an oven with ventilation at different temperatures (20° C., 60° C., and 95° C.) on an aluminum block. Higher temperatures produced most homogeneously shaped dots by allowing faster water evaporation and avoiding the 'coffee ring' effect observed when drying at 20° C. (FIG. 2A-B), and the local PL maximum observed when drying at 60° C. (FIG. 2C-D). The overall PL profile of the sensor was also much more uniform at 95° C. (FIG. 2E-F).

The SWCNTs emit NIR PL that can be detected using a spectrometer or IR camera; both are generally equipped with liquid nitrogen cooled InGaAs detector. As the (6,5) chirality of SWCNTs has an emission peak at around 1000 nm, a simpler camera with a CCD or CMOS detector can be used. For the assay, a custom optical setup was constructed (FIG. 3) using a 532 nm laser for SWCNT excitation and a 1.3 MP CMOS camera with two long-pass filters (900 nm and 700 nm) for signal detection. The camera's sensor has limited quantum efficiency above 1000 nm. However, we were able to record a clear PL signal from the (6,5) tubes (FIG. 3B). On the other hand, (7,6) chirality that has a peak at about 1100 nm produced no signal.

Sensors Response Toward Acetic Acid Vapor

Figures 4A, 4B:
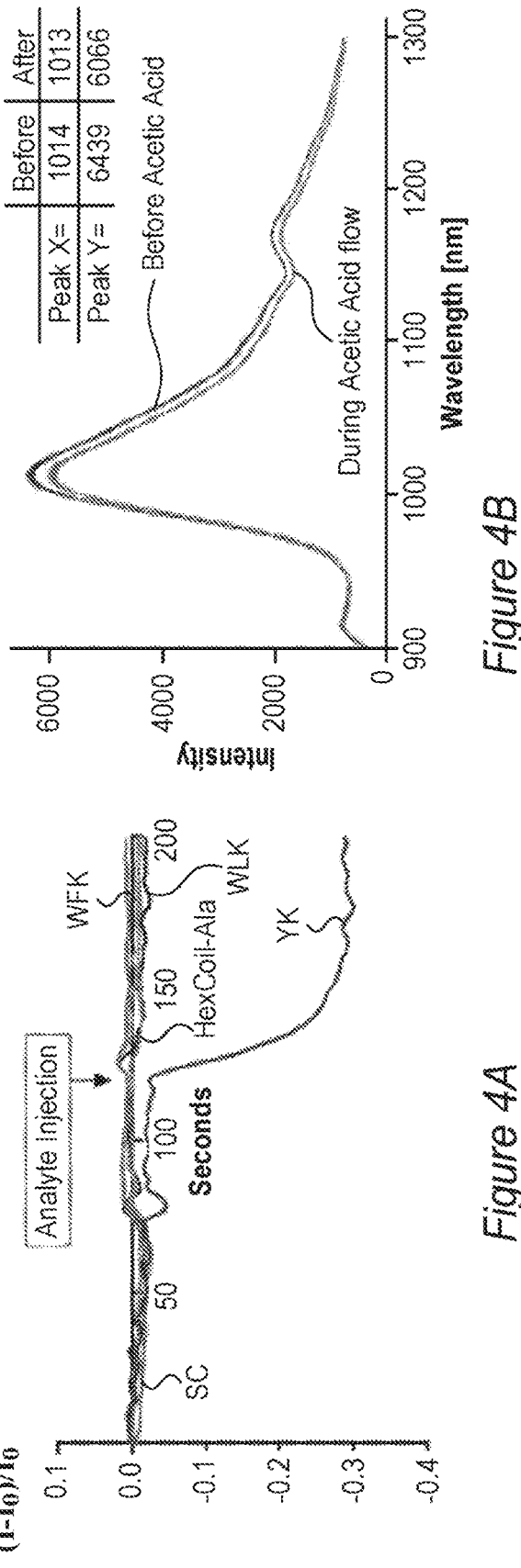
FIGS. 4A-D show the response of the SWCNTs/peptide sensors toward acetic acid in the gas phase.

Sensor responses to acetic acid in the gas phase were assessed by drying sensors (YK, WLK, WFK, HexCoil-Ala, and sodium cholate) side-by-side and simultaneously testing their response to the acetic acid, at room temperature using the 'static' method. For 'static' measurements, sensors were drop-dried on the sidewall of the cuvette, calibrated for 10 min against DW, and then acetic acid was introduced to the bottom of the cuvette to a reach a final concentration of 4 g/L (0.4% v/v) (FIG. 3C). The fluorescence of the YK sensor began to decline immediately after analyte introduction and reached a steady-state of 30% quenching after 40 sec (FIG. 4A). The 40-sec interval consisted of both the time to a steady-state acetic acid concentration in the air inside the testing cuvette and the time it took the sensor to respond. Other sensors did not respond at all, showing a remarkable specificity of YK toward acetic acid compared to other peptides, including positively charged peptides.

Figure 4C:
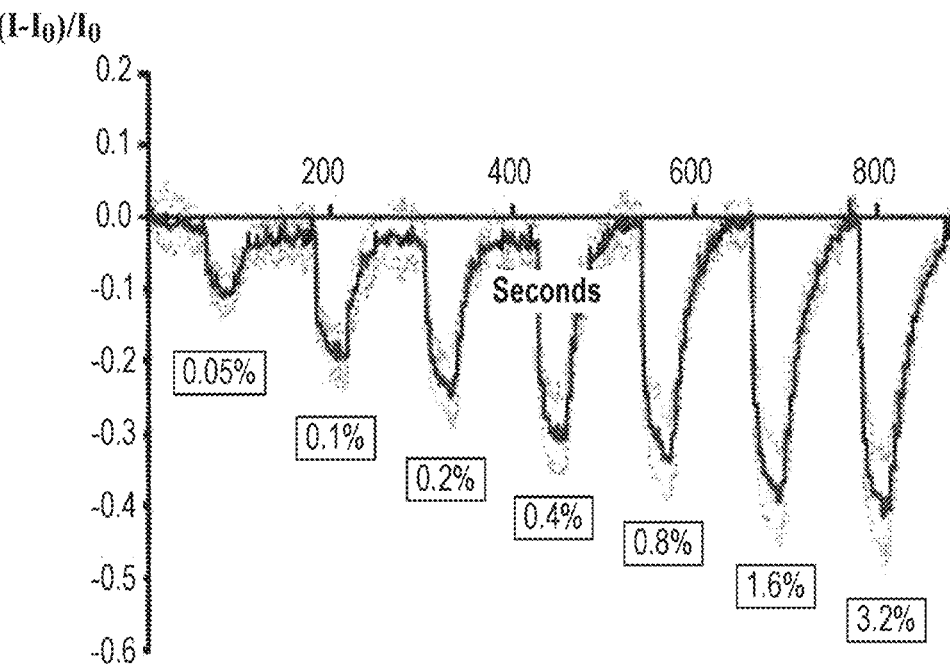
Figure 4D:
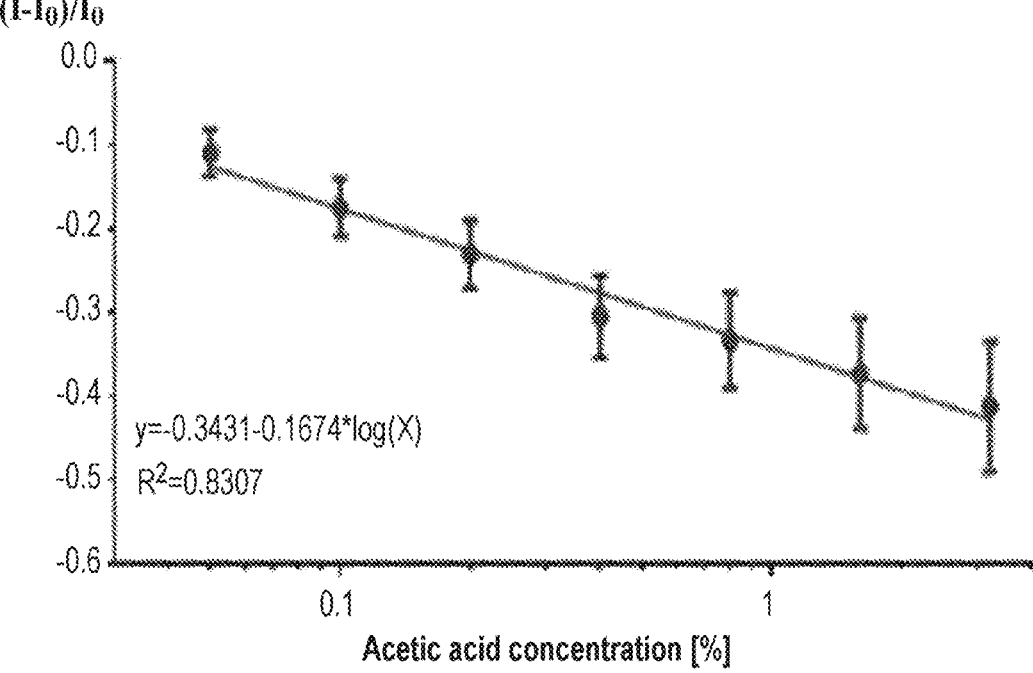

The 'dynamic' setup was used to investigate the ability of the YK sensor to distinguish between different concentrations of acetic acid, and to assess its ability to recover after analyte flow stops. For the 'dynamic' measurement, a clear airflow was passed above the analyte (sniffing), before reaching the cuvette (FIG. 3D). The YK sensor response to a range between 0.5 g/L (0.05% v/v) and 32 g/L (3.2% v/v) acetic acid in DW was evaluated. The sensors were calibrated against a flow of clear air at 55% relative humidity (RH) before introduction of the analyte to the airflow. The sensor underwent quenching upon addition of acetic acid, similar to that seen using the 'static' method (FIG. 4C) and showed a linear dose-dependent response on a semi-logarithmic graph with r=0.83 (FIG. 4D). The sensor also showed good recovery after the flow was switched back to clear air. The results were verified using a microscope coupled to a spectrometer, that showed quenching following acetic acid vapor introduction, without noticeable wavelength shift (FIG. 4B).

Figure 5:
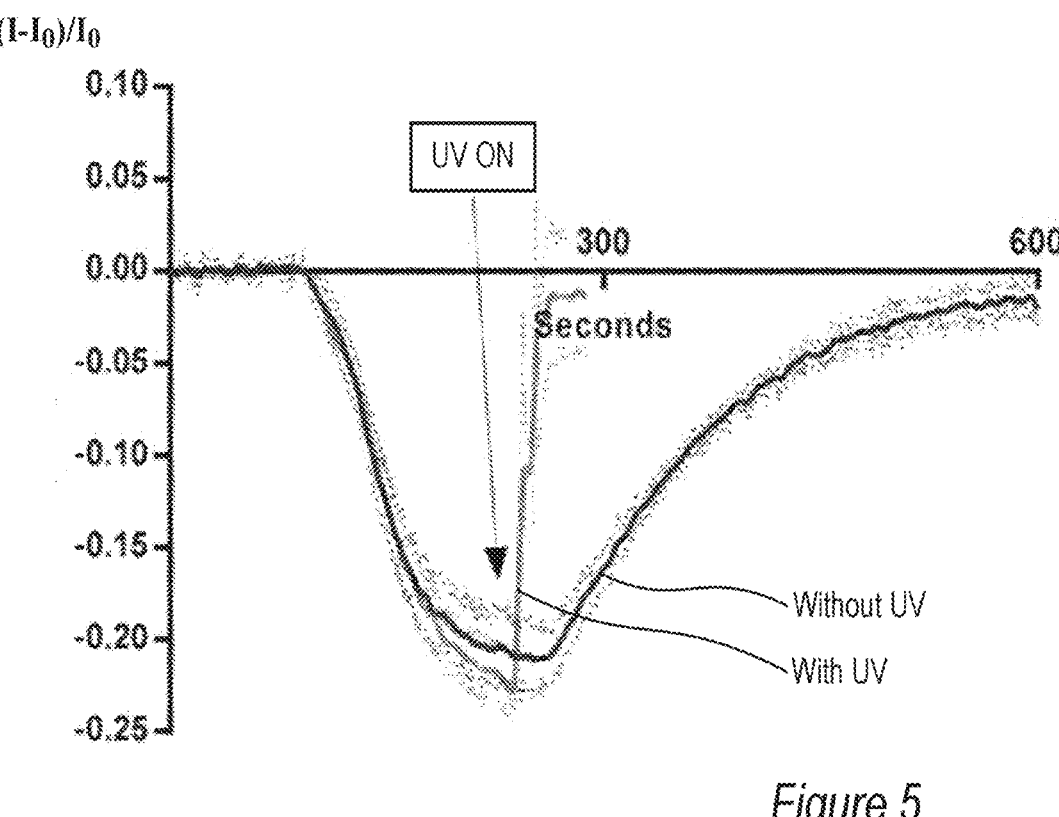
FIG. 5 depicts the influence of UV irradiation on the recovery time of the SWCNT/YK sensor after acetic acid sensing. n=6, dashed lines represent standard deviation.

Detachment of absorbed molecules to the SWCNTs can be enhanced by heating. Carbon nanotubes are known for their excellent thermal conductivity. It has been reported that ultraviolet photon absorption had been used to heat single- and double-walled carbon nanotubes in vacuum to 1000° C. This feature was used, for example, to recover NOx-gas in a SWCNT electrochemical sensor. The recovery of the sensor from acetic acid was relatively slow despite the flow of clear air above it. UV illumination for 25 sec significantly speeded recovery of the YK sensor, while it did not affect the baseline PL of the sensor. Thus, UV may potentially be used for enhanced recovery of the sensor (FIG. 5).

Sensing an Increasing of Acetic Acid Concentration in Red Wine

Figure 6A:
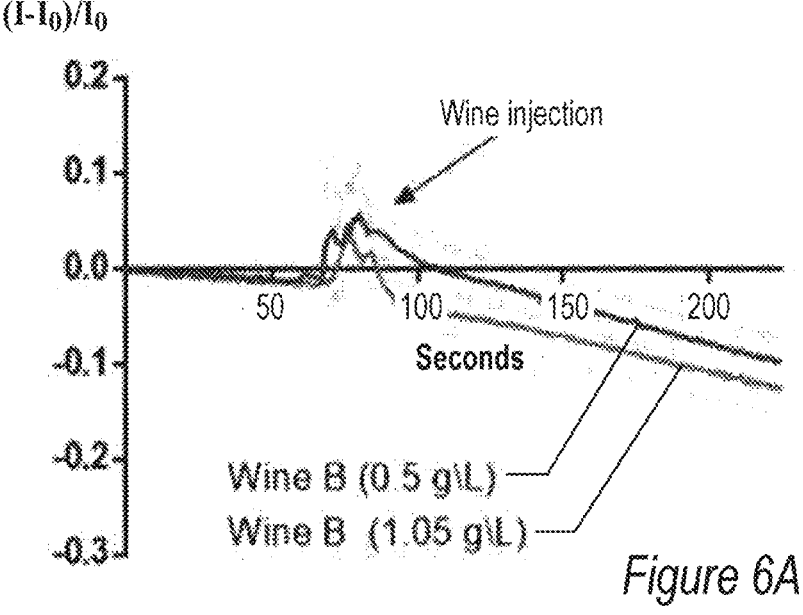
FIGS. 6A-D depict the response of the SWCNTs/YK sensor toward red wine from two brands, with or without external addition of the Acetic acid.
Figures 6B, 6C, 6D:
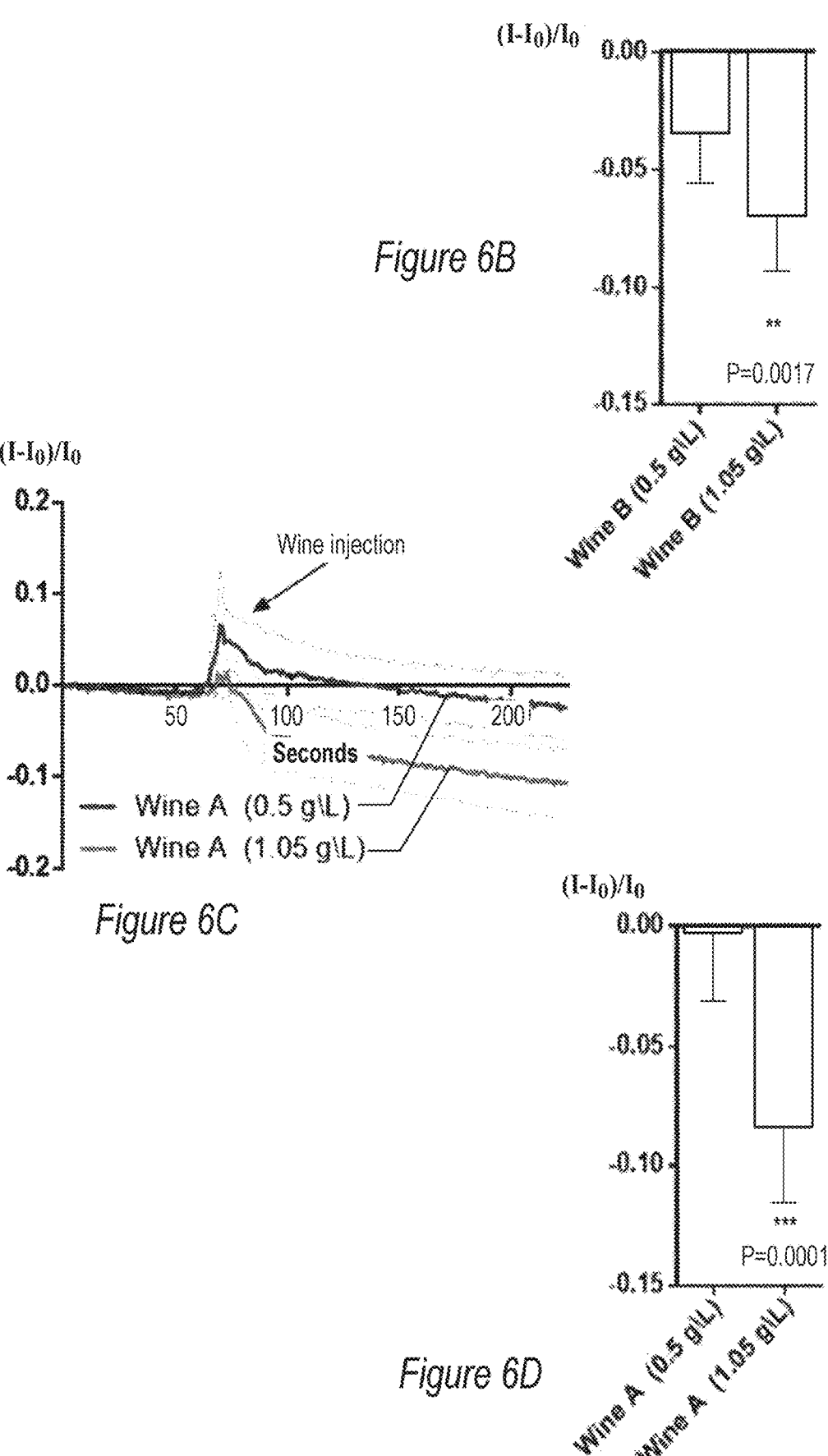

In wine, acetic acid considered to be undesirable at high concentrations; the US legal limit for red wine is 1.4 g/L. The aroma of wine consists of 600 to 800 volatile compounds, many of which may potentially bind SWCNTs and affect the PL. We hypothesized that as the response of the YK sensor toward acetic acid was strong even at small concentrations (10% quenching at 0.5 g\L), the sensor will be able to differentiate between acetic acid and other wine aroma components. To evaluate the ability of the YK sensor to detect an excess of acetic acid, we tested two types of local red wines. By using a steam distillation method, we found that the acetic acid content in wine A and wine B was 0.53 g/L and 0.56 g/L, respectively (0.05% and 0.056%). Using the static setup, we tested the YK sensor response to intact wines versus to wine with the addition of 0.5 g/L glacial acetic acid—bringing the final amount of acetic acid to ~1 g/L. In both tested wines, the increased levels of acetic acid resulted in more intense quenching of the PL (FIG. 6B-D).

However, the level of the quenching was dependent on the wine brand, likely as a result of interference of other wine aroma compounds. After introduction of the wine to the bottom of the cuvette, the PL was first slightly upregulated before beginning a decline (FIG. 6A-C). The initial upregulation probably indicates rapid absorption of other wine components before binding of enough molecules of acetic acid caused a decline. The graduated decline was observed throughout the remainder of the experiment, with a different slope between two types of wines.

Figure 7A:
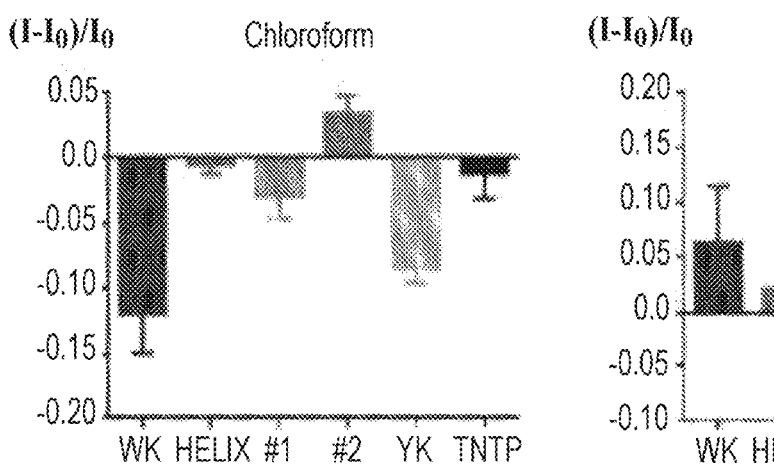
Figure 7A:
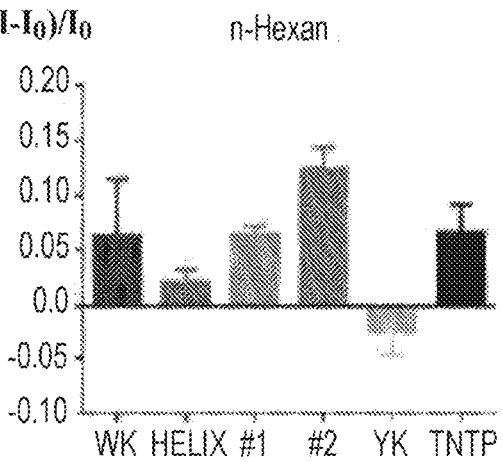
Figure 7A:
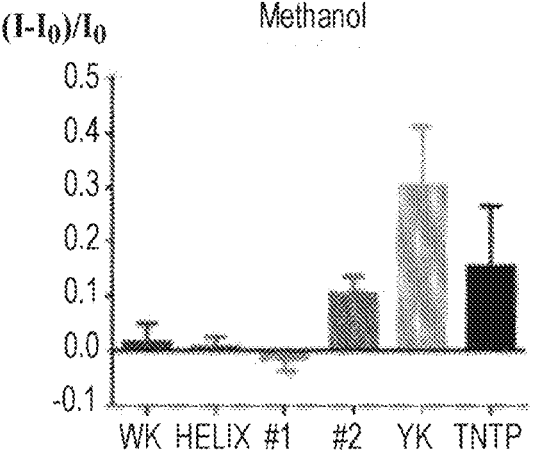
Figure 7A:
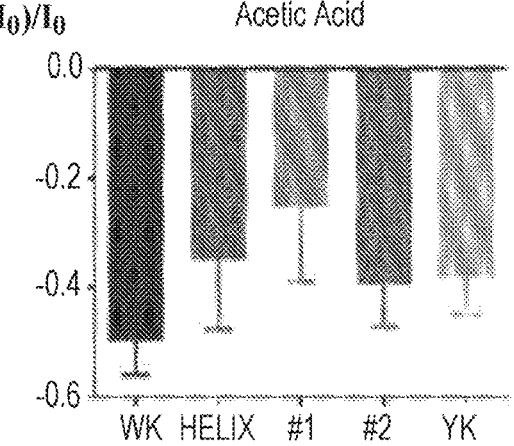
Figure 7A:
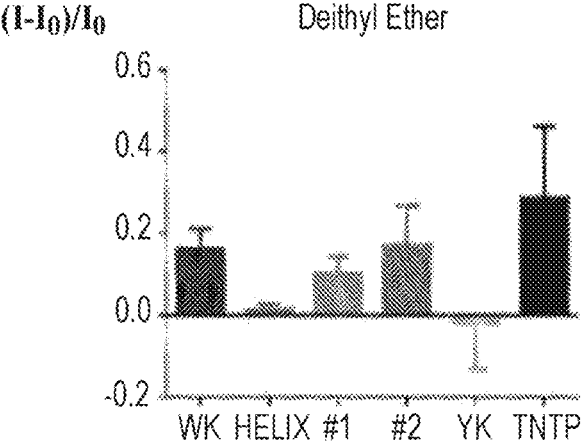

In additional experiments, sensors were screened against a library of five analytes (n-Hexane, Methanol, Diethyl Ether, Chloroform, and Acetic acid). All six sensors were tested simultaneously against five analytes in the gas phase, in-room temperature. The responses of the fluorescent emission of the peptide encapsulated SWCNT dry dots were continuously recorded to observe kinetics and analyzed with custom build Python software. First, the sensors were calibrated against clear air; then, the analytes were introduced to the flow. The analytes produced a different spectral fingerprint change after the first 35 seconds of the experiment. In the case of n-Hexane, Methanol and Diethyl Ether mainly upregulation of PL while Chloroform and Acetic acid cause quenching of the PL (FIG. 7A). The response to Acetic Acid was the strongest one among tested VOCs (FIG. 7B); on average, the PL drops by 40% in all sensors. To confirm the unique signature of each analyte, we perform a principal compound analysis (PCA) for all six sensors—the results show a differentiation to distinct regions on the plot enabling analytes classification. First, two components of PCA (0.87 and 0.065) are shown (FIG. 7C).

Next, we tested the minimal number of sensors that enable VOCs classification and explore what combination of the sensors provides the most accurate results for recognition of all six analytes. It was found that a combination of only two sensors, YK and TNTP, is enough for the precise classification of all 6 VOCs in tested amounts (FIG. 7D).

Figures 8A, 8B, 8C, 9A, 9B, 9C:
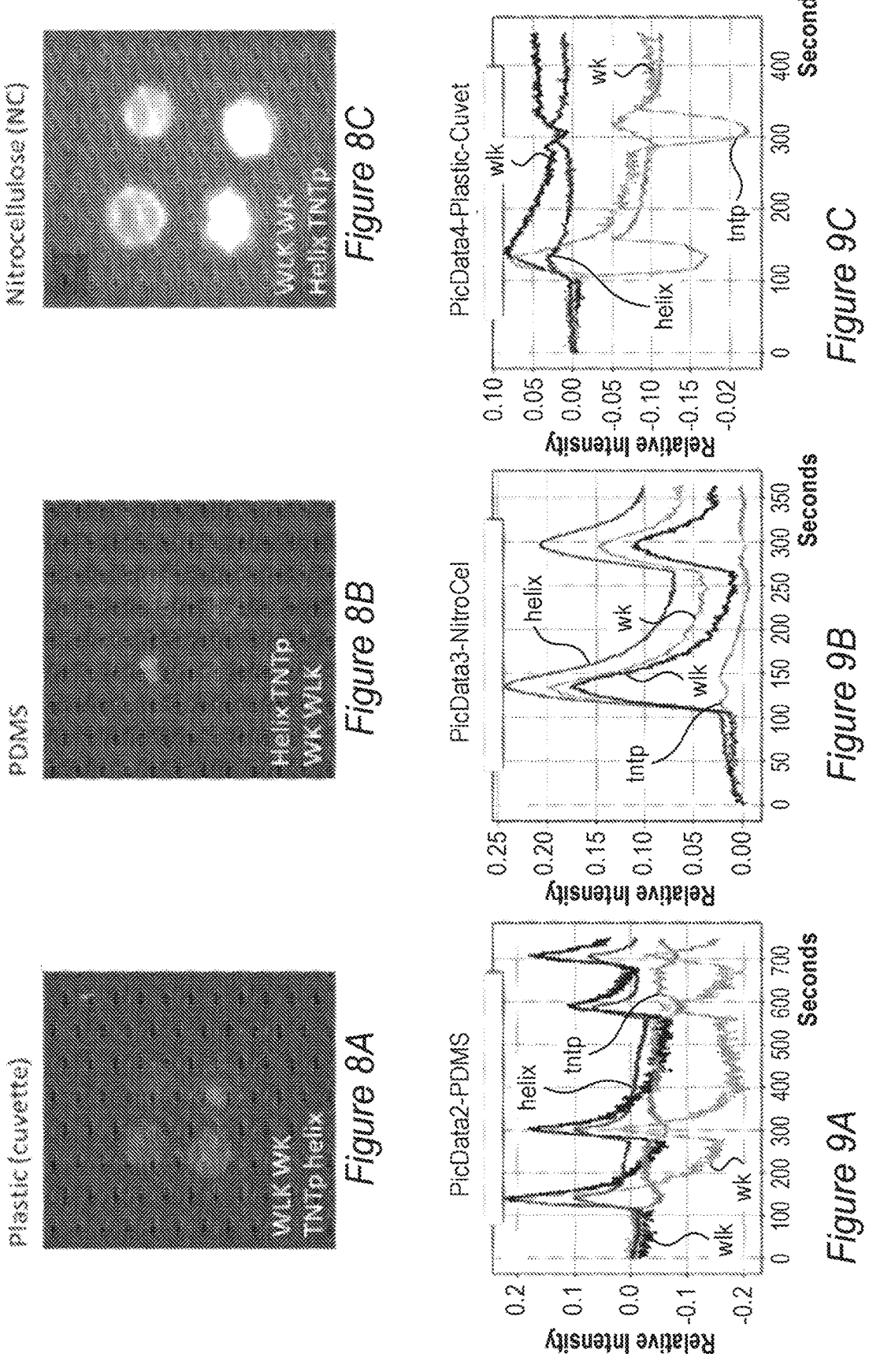
FIGS. 8A-C compare different surfaces for dots drying.
FIGS. 9A-C provide a study comparing response toward 10% Ethanol and 10% Methanol of sensors dried on different surfaces.

FIG. 8 demonstrates different surfaces for sensors drying. The surface affects the geometrical shape of the dry dot, the quantum yield (fluorescence intensity) and the response to the analytes.

FIG. 9 demonstrates difference in response of the sensors toward analytes (10% ethanol or 10% methanol) on different surfaces. Those, not only surface influence the geometry end PL intensity f the sensors, but also their response. For example, tntp sensor (yellow line) goes down when dried on plastic (2:C). When dried on nitrocellulose (2;B) has almost no response only with slight upregulation.

Figures 10A, 10B, 10C:
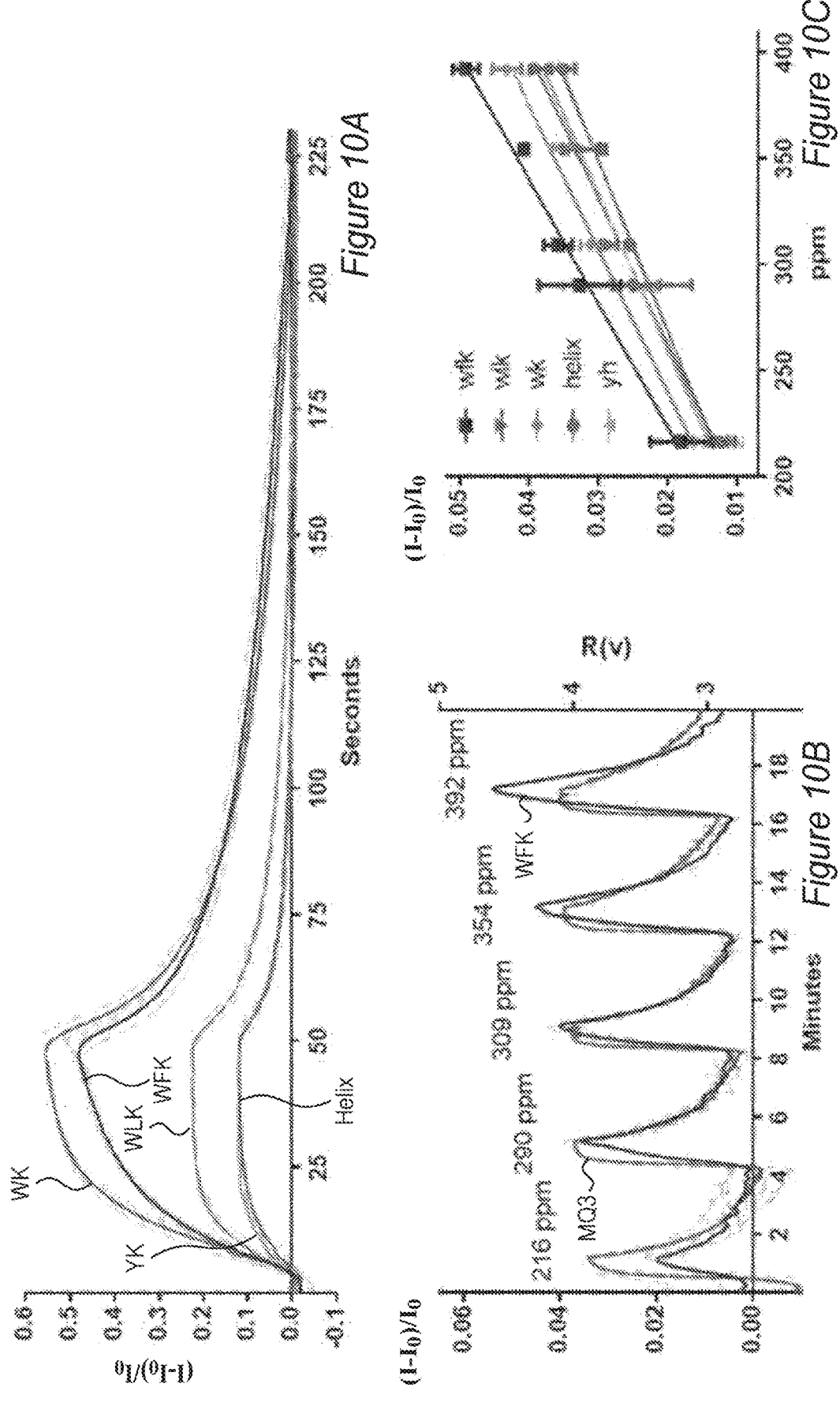
FIG. 10A) Change in photoluminescence of five sensors in response to the vapor of a 10% v/v ethanol solution passed above the sensors for 45 seconds, followed up by a flow of clear air (n=4).
FIG. 10C) Linear graphs presenting the dependence of the sensor PL on ethanol concentration (n=3). Linear equation and linear correlation coefficient could be found in supplemental materials.

FIG. 10 demonstrates the reaction of prepared sensors to a solution of 10% v/v ethanol in water. To simulate the sniffing of a solution, clear air was passed above the ethanol solution before entering the sensor chamber. As seen in FIG. 10A, each of the sensors responded differently to the ethanol vapor. While all five sensors showed increased PL intensity after analyte flow, both the kinetics and the final intensity were significantly different. WLK, HelixCoil-Ala, and YH sensors reached a plateau in PL after approximately 24 sec from the start of the analyte flow, while the PL of WFK and WK sensors continued to rise even after 45 sec. The recovery rate upon passage of clear airflow through the chamber was also different; for example, even though the WK sensor showed a greater change in PL, it recovered slightly faster than the WFK sensor. The overall recovery took around 160 sec; however, it could have potentially been enhanced by increasing airflow or by heating the sensors.

The sensitivity of drop-dried peptide-encapsulated SWCNTs sensors to different concentrations of ethanol was evaluated. The PL of the WFK sensor increased linearly with increasing concentrations of the ethanol vapor (FIG. 10B-C). The developed biosensor showed a limit of detection around 216 ppm of ethanol. A similar linear response was observed for the other sensors as well (FIG. 10C).

Figure 10D:
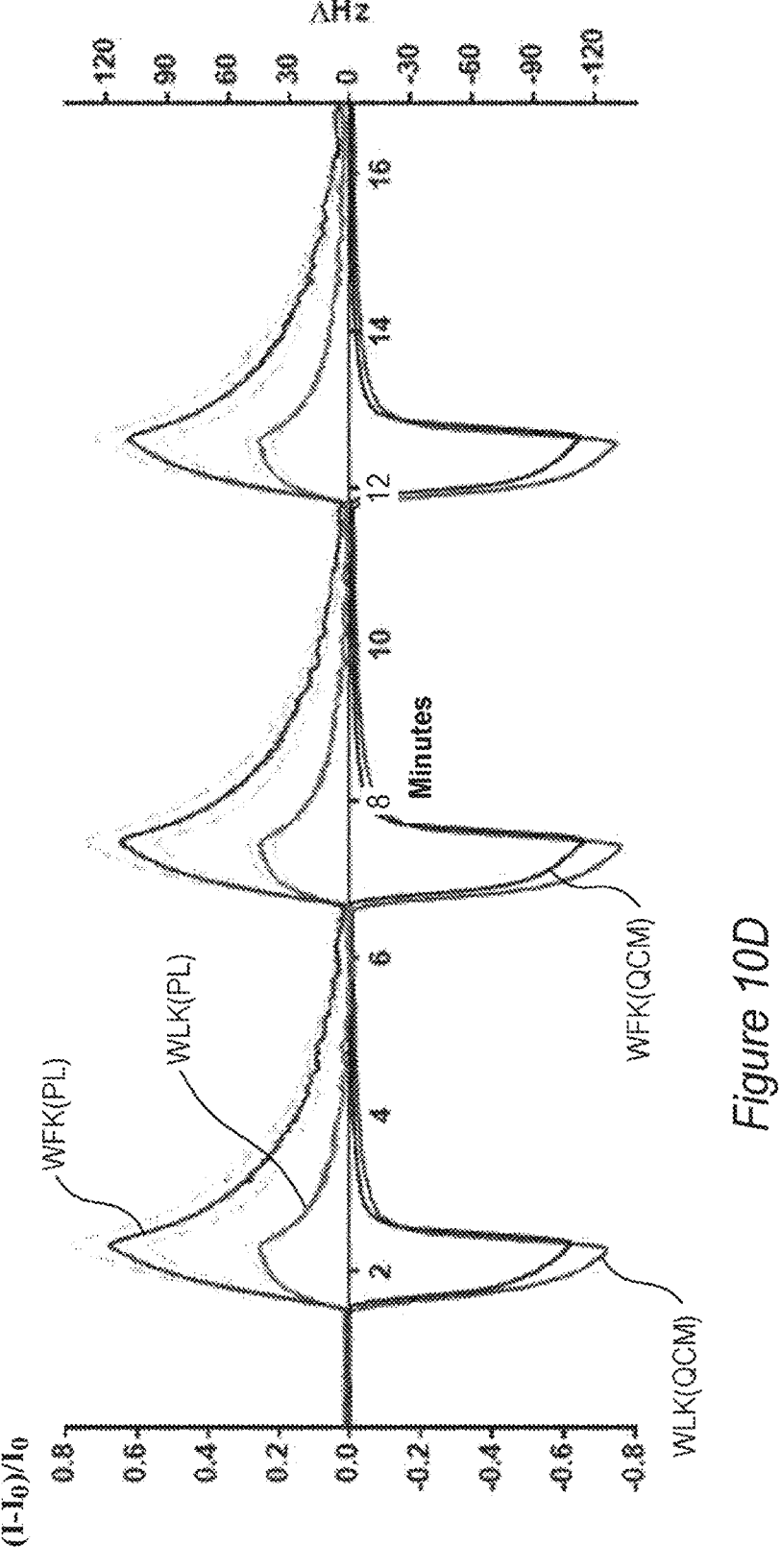
FIG. 10D) WFK and WLK sensor responses to 10% v/v ethanol vapor, passed over the sensors, followed by clear airflow, as measured using coupled optical and QCM sensors. Error bars and dashed lines represent the standard deviation (n=3).

In order to gain insight into the sensing mechanism, the binding kinetics and the optical response were simultaneously recorded by passing the 10% v/v ethanol solution vapor over a QCM module immediately before entering the optical chamber. Upon analyte introduction, the QCM sensor showed a graduate decrease in a signal, indicating analyte binding to the peptide-SWCNTs composite, while the optical sensors showed a simultaneous increase in PL (FIG. 10D). After the introduction of the clear airflow, graduate analyte release was observed, with full recovery of QCM and optical sensors. The QCM sensors responded faster and recovered faster than optical sensors, and this could be explained by the chamber geometry. The QCM chamber is very narrow; thus, the flow speed of the analyte and of the clear air is fast. In contrast, the PDMS chamber used for optical sensing is much wider; thus, the flow is slower, as was the response. Interestingly, WFK-QCM sensors were less reactive to the ethanol vapor as compared to the WLK-QCM sensor, while the optical response of WFK was more than three-fold higher than that of WLK. These findings indicate that the total bound amount of analyte was not the only determinant of the strength of the optical response.

Figures 11A, 11B:
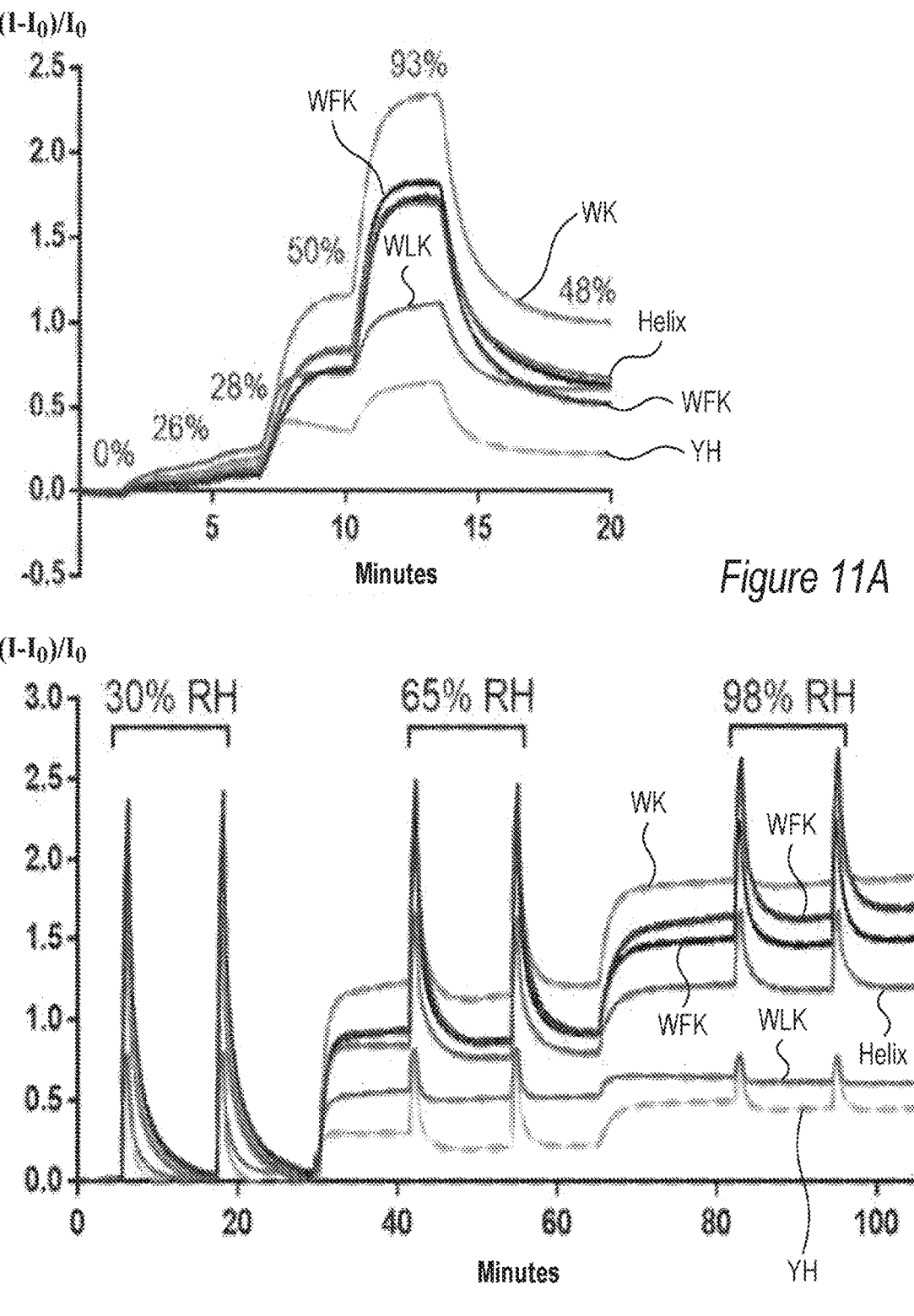
FIGS. 11A-B demonstrate the effect of humidity on the response of 6 different SWCNTs sensors toward 300 ppm Ethanol in gaseous phase. We compared response in 44% relative humidity and in 88%. It could be seen that in the Hight humidity response is slightly lower, but still strong and clear.

As humidity is a highly dynamic environmental parameter, which may pose challenges to artificial nose systems, sensor response to ethanol vapor under different humidity levels was assessed. Humidity levels had a minor impact on the final PL intensity in response to the vapor of 10% v/v ethanol of most of the sensors (FIG. 11B). The WK and WLK sensors were the most affected. For example, the WK sensor showed an 8% decrease in the response under 30% RH and 3% increase under 98% RH as compared to the response under RH of 65%. Interestingly, although the final PL intensity of the sensors after ethanol sensing was not significantly impacted by RH, their baseline PL levels were profoundly affected by humidity (FIG. 11A). These results could be explained by the fact that water molecules bind to the SWCNTs surface and affect sensors PL in a similar way to other analytes.

Figure 12A:
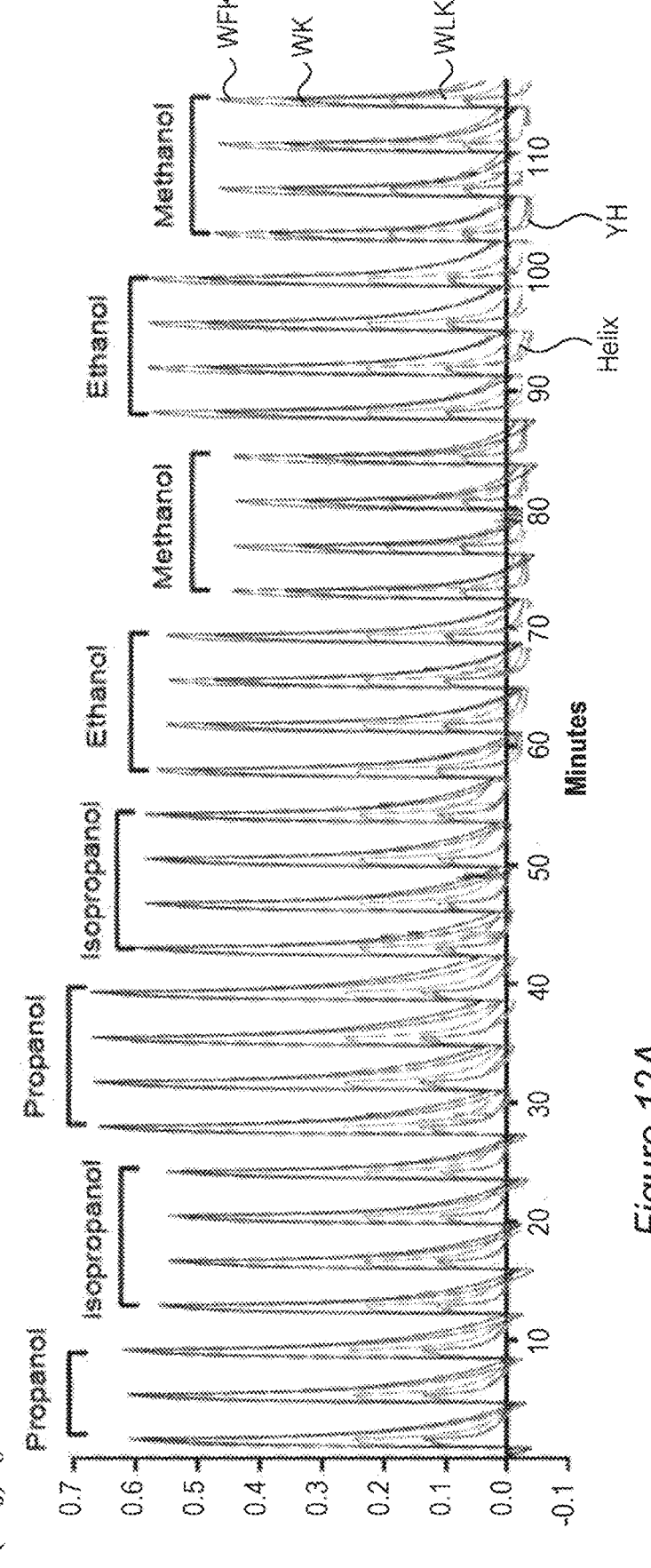
Figures 12B, 12C, 12D:
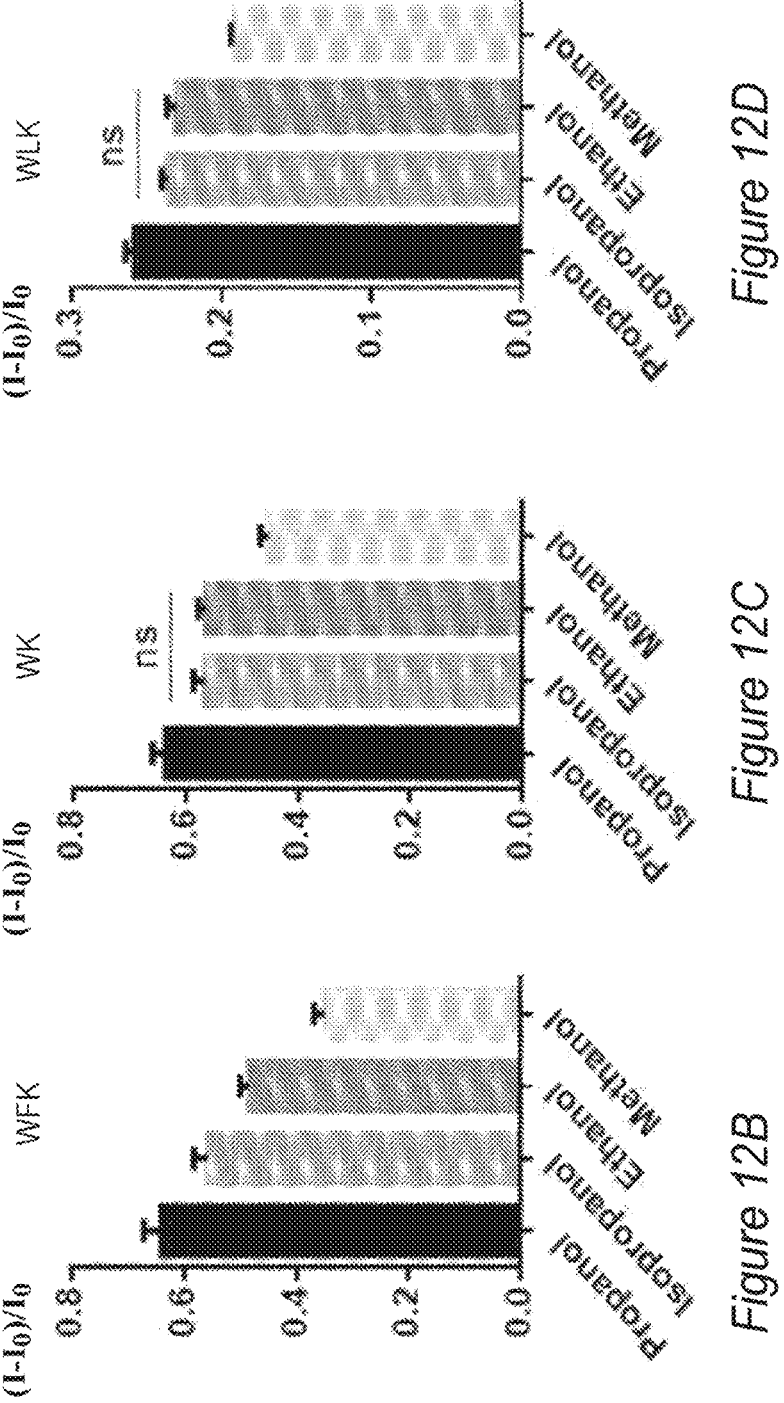

The results above indicated that there is an optical response of drop-dried sensors toward ethanol vapor, with each of the sensors reacting differently, thus producing a rich optical fingerprint. Sensory capacity to generate distinct optical patterns for other alcohols was then assessed by exposing them to methanol, propanol, and isopropanol 10% v/v solutions vapors. The selected molecules are structurally similar, rendering them a worthy means of determining the discriminatory abilities of the sensors. The response of the sensors to the vapors of the solutions was recorded for two-hours. In each cycle, vapor was introduced and then cleared out with clear airflow. The sensors showed a remarkable recovery after each cycle (FIG. 12A), with the baseline and peak PL heights remaining stable throughout the experiment.

The observed PL changes (FIG. 12B-F) revealed that as with ethanol vapor, each sensor responded differently to the analytes. While WK, WLK, and YH failed to distinguish between ethanol and isopropanol, WFK and Helix enabled their discrimination. All sensors showed a high response to propanol and low response to methanol. The overall reaction of WK and WFK sensors to alcohol was strongest, followed by WLK, YH, and then HelixCoil-Ala. LDA (FIG. 12G) of the responses of all five sensors showed clear discrimination between the four tested analytes, despite their structural similarity. Moreover, sensors were able to discriminate a mixture of ethanol and methanol as well.

Few distinct mechanisms accounting for PL modulation of SWCNT have been identified to date that may explain the observed phenomena. It includes; Fermi level shift caused by an analyte adsorption with a favorable reduction potential (Barone et al., 2005; Heller et al., 2011), exciton quenching caused by an analyte that perturbs the exciton itself (Barone et al., 2005; Heller et al., 2011), or solvatochromic shifting caused by perturbing an encapsulating peptide, thereby changing the accessibility of the SWCNT surface to other molecules (Choi and Strano, 2007; Heller et al., 2011). Selectivity can be imparted to the above mechanisms by carefully designing wrapping molecules to affect or block the analyte binding ability to the SWCNT walls (Heller et al., 2011). Interaction with the analytes may also change the SWCNT's accessibility to specific moieties on the encapsulating peptides or the nitrocellulose paper or water vapors, thus affecting PL.

Figure 13A:
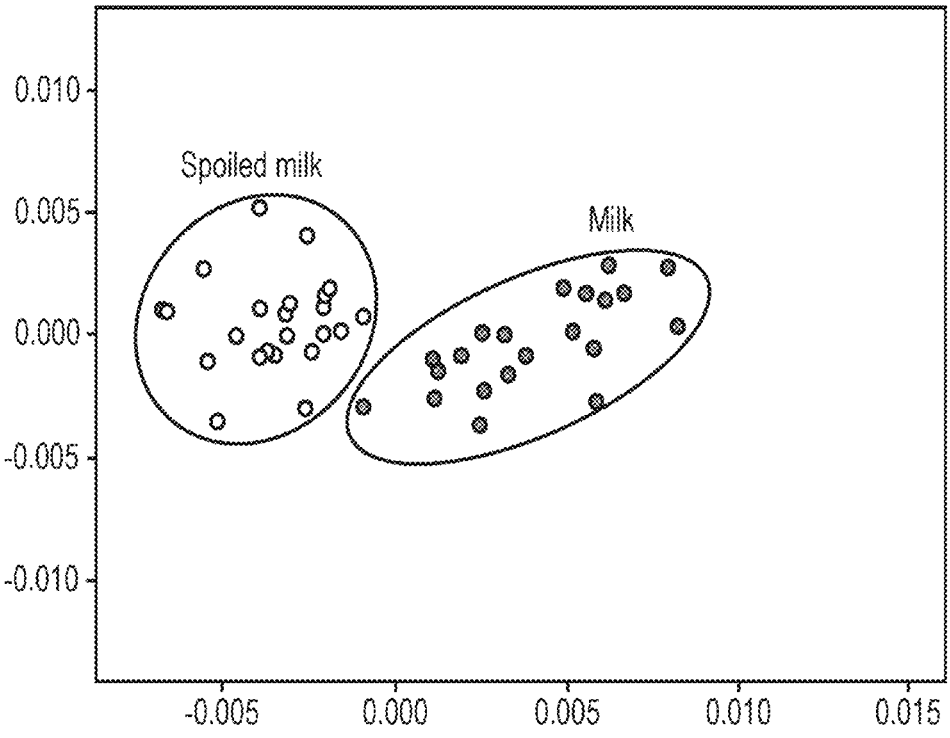

An example for the use of a system for discrimination between normal and spoiled milk was also developed. 6 Sensors were used. PCA analysis (FIG. 13) clearly shows a difference between two analytes.

Figure 14A:
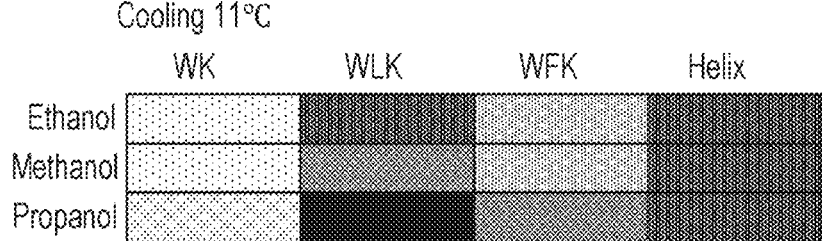
FIGS. 14A-B show the response of the sensors is temperature depending. Direct cooling of the sensors are influence the response of the sensors toward analytes.
Figure 14B:
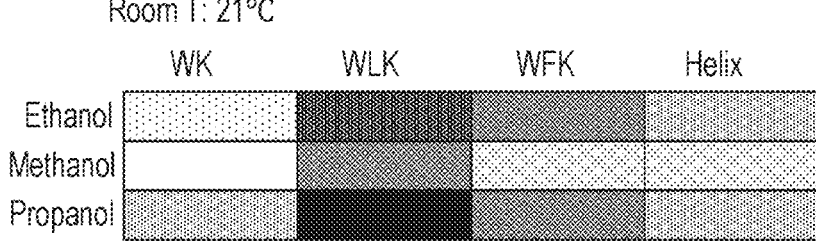
Figure 15:
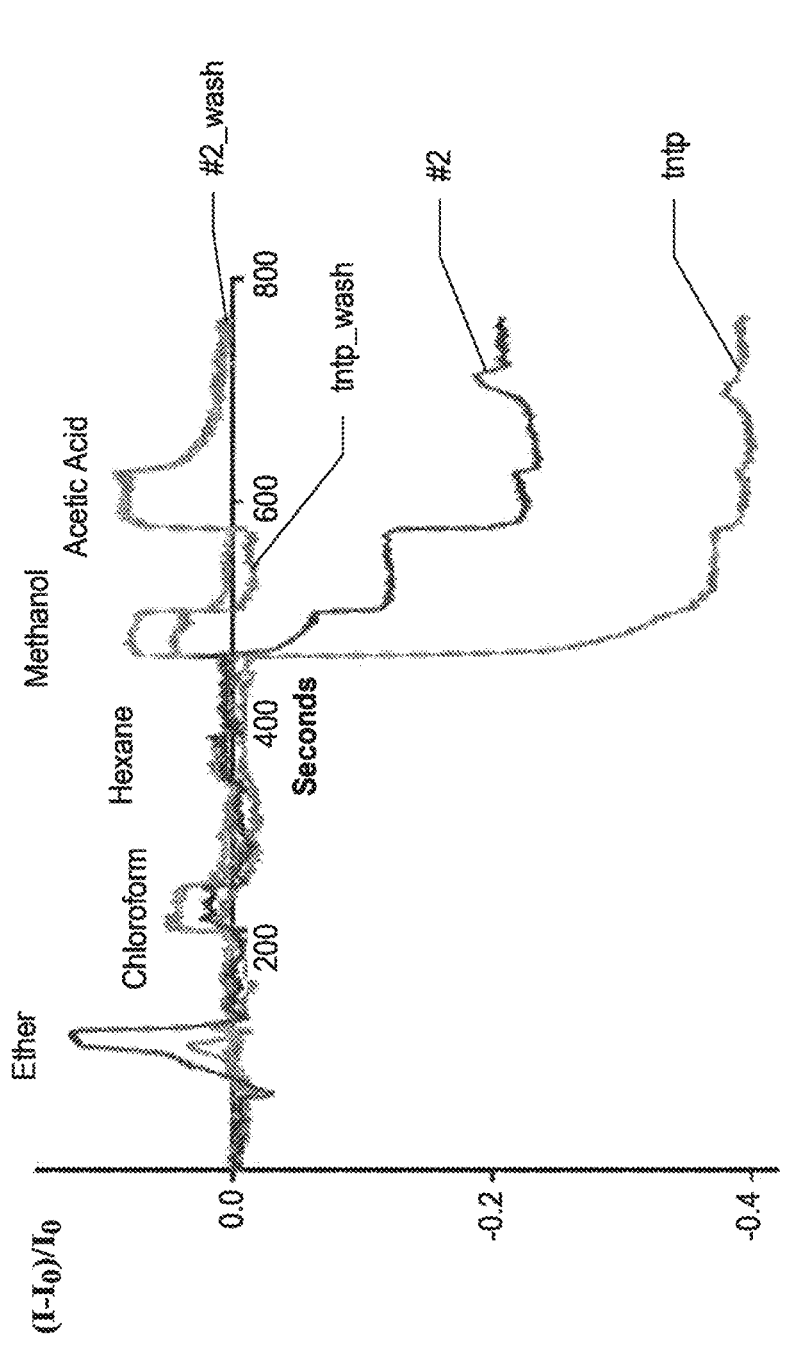
FIG. 15 demonstrates the addition or removal of salts (NaOH) from SWCNTS/Peptide suspension could affect sensors response. Here we compare response of two sensors (#2 and TNTp) toward different analytes in gashouse phase. The sensors were prepared in DW with addition of NaOH till pH12. Half of the sensors were washed from salts with DW after drying. As it could be seen, the response was very different. For example washed #2 gave upregulation toward Methanol vapor while unwashed produced downregulation of the signal.

FIG. 14 shows that the responses of the sensors is temperature depending. Direct cooling of the sensors to 14 degrees centigrade had an influence on the response of the sensors toward analytes. FIG. 14 shows a response of 4 sensors (WK, WLK, WFK, HELIX) toward vapor of 10% Ethanol, Methanol or Propanol. For example, cooling caused WK sensor not only to increase its response but also displayed an opposite behavior. If in RT there was an upregulation of the signal, during cooling the signal was quenched in response to Ethanol.

Figures 16A, 16B, 16C, 16D:
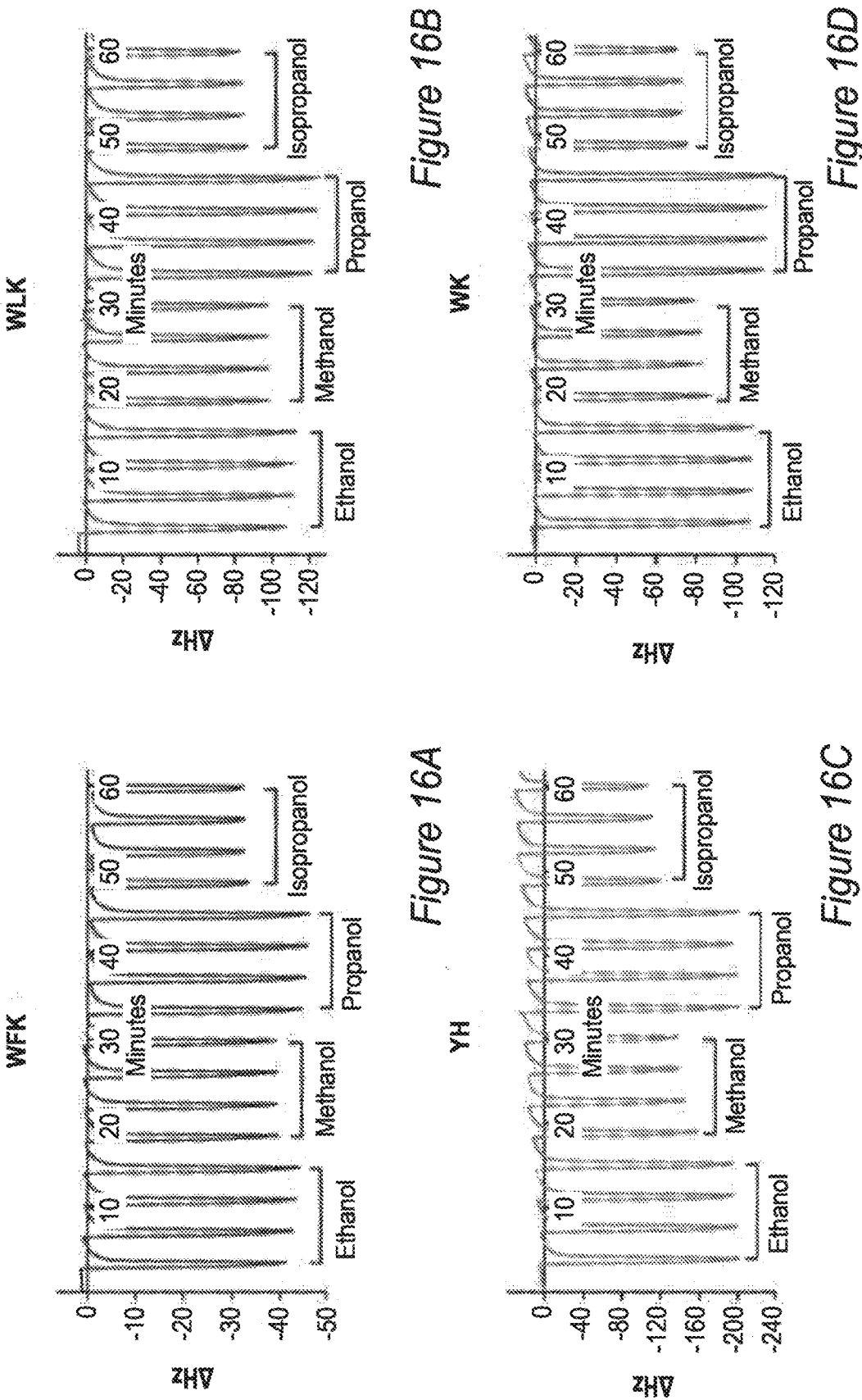
FIGS. 16A-I show response of the QCM crystal with a drop-dried peptide-encapsulated SWCNTs sensors to vapors of 10% v/v solution of ethanol, methanol, propanol, and isopropanol. Four peptides were tested: WFK, WLK, YH, and WK.
Figure 16E:
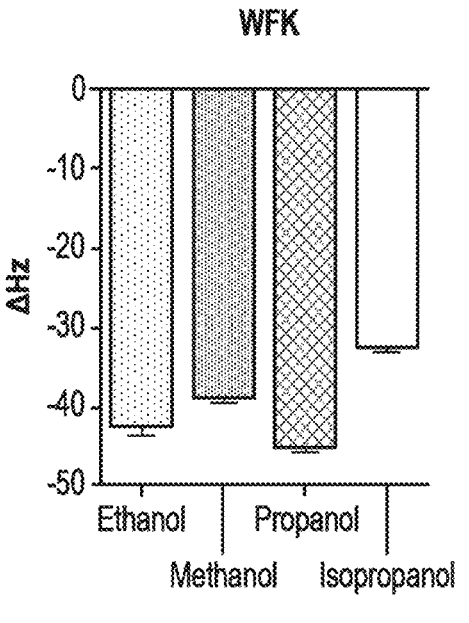
Figure 16F:
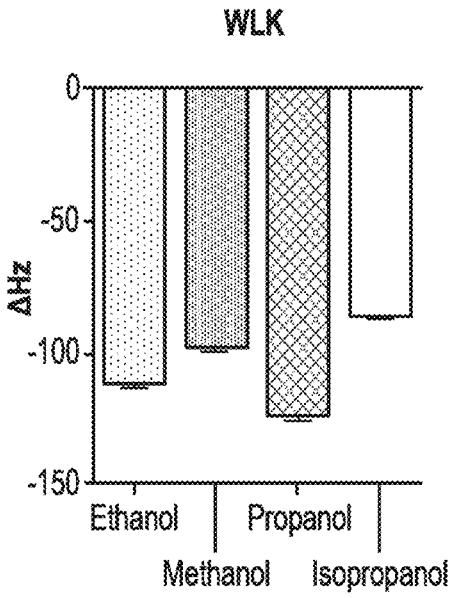
Figure 16G:
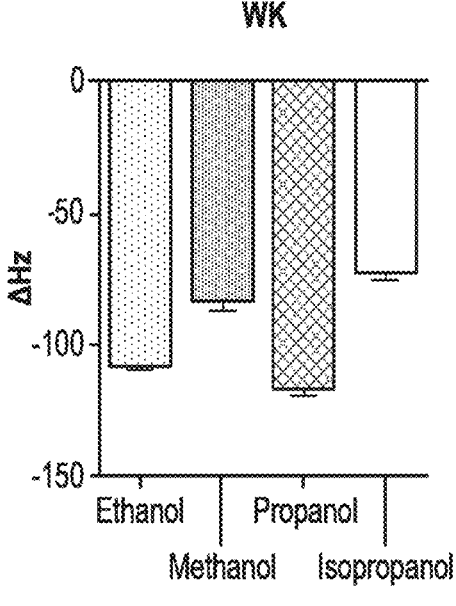
Figure 16H:
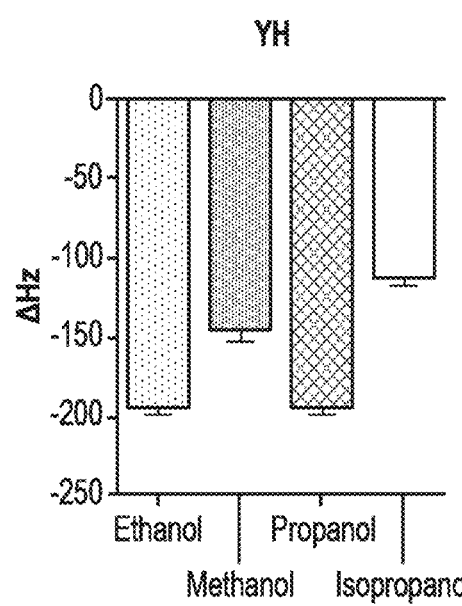
Figure 16I:
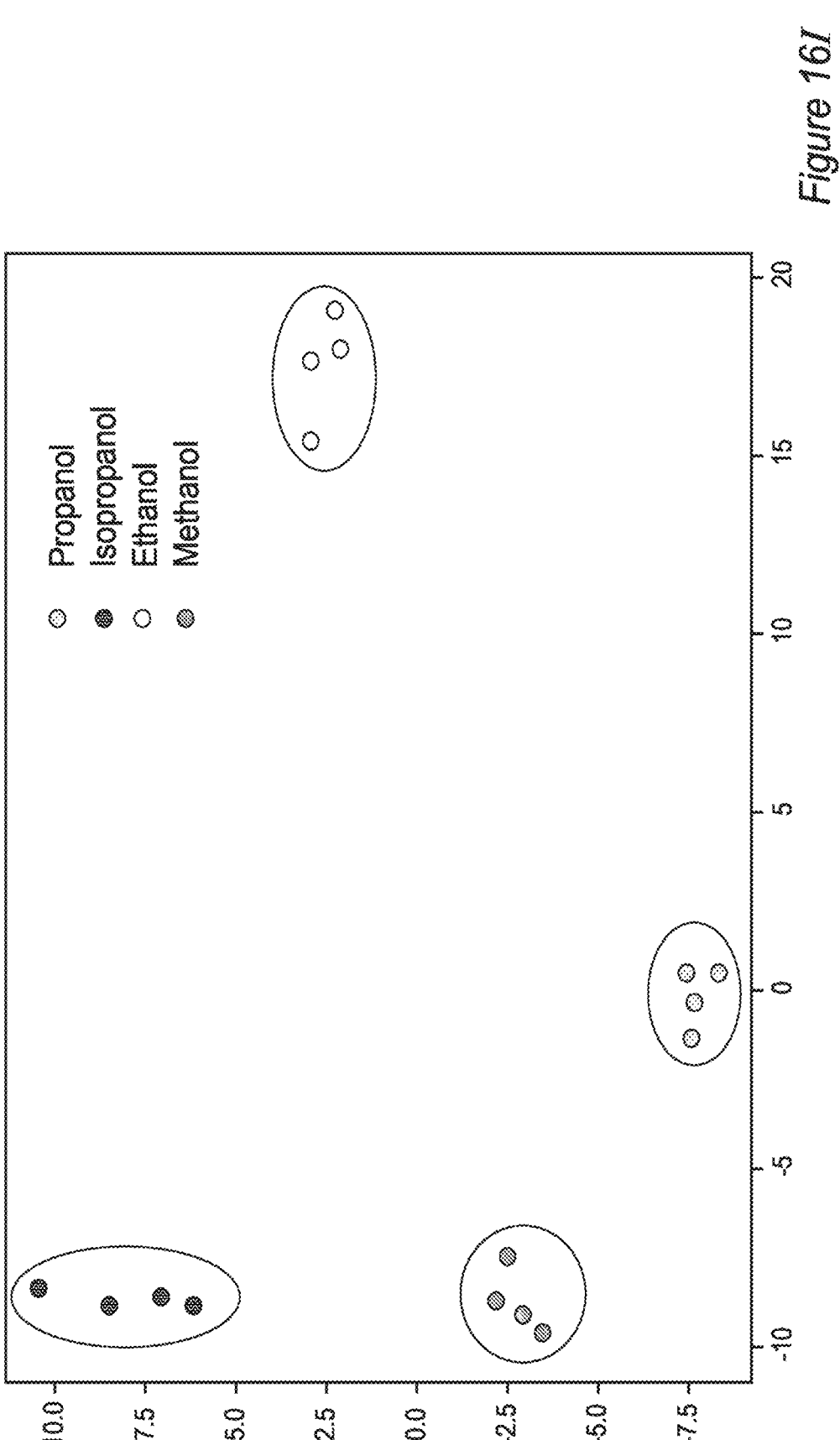

The binding kinetics of the alcohols to the different sensors was then assessed using the QCM technique. Four sensors (WFK, WLK, WK, and YH) were drop-dried separately on the QCM crystal, and vapor of different analytes was passed over it, with intermittent clean air washes. Except for YH, which displayed a minor drift, the rest of the sensors presented a sufficiently stable recovery to baseline levels after each cycle (FIGS. 16A-D). Using only the QCM data and performing LDA analysis also enabled discrimination between all four volatiles (FIG. 16I).

Both the PL response and QCM measurements demonstrate that sensors have a similar pattern toward different analytes, suggesting once again that analytes bind mainly directly to SWCNTs while peptides may block specific binding sites. However, it is challenging to compare QCM response to the optical response. First of all, the QCM has a very narrow chamber; thus, the analyte flow in the QCM is much faster. Moreover, the substrate surface is very different; while in QCM, the sensors were dried on a flat gold surface, during optical measurements, the sensors were drop-dried on a paper. The paper has a significantly larger surface volume; thus, the dried dot's geometry is entirely different.

Figure 17:
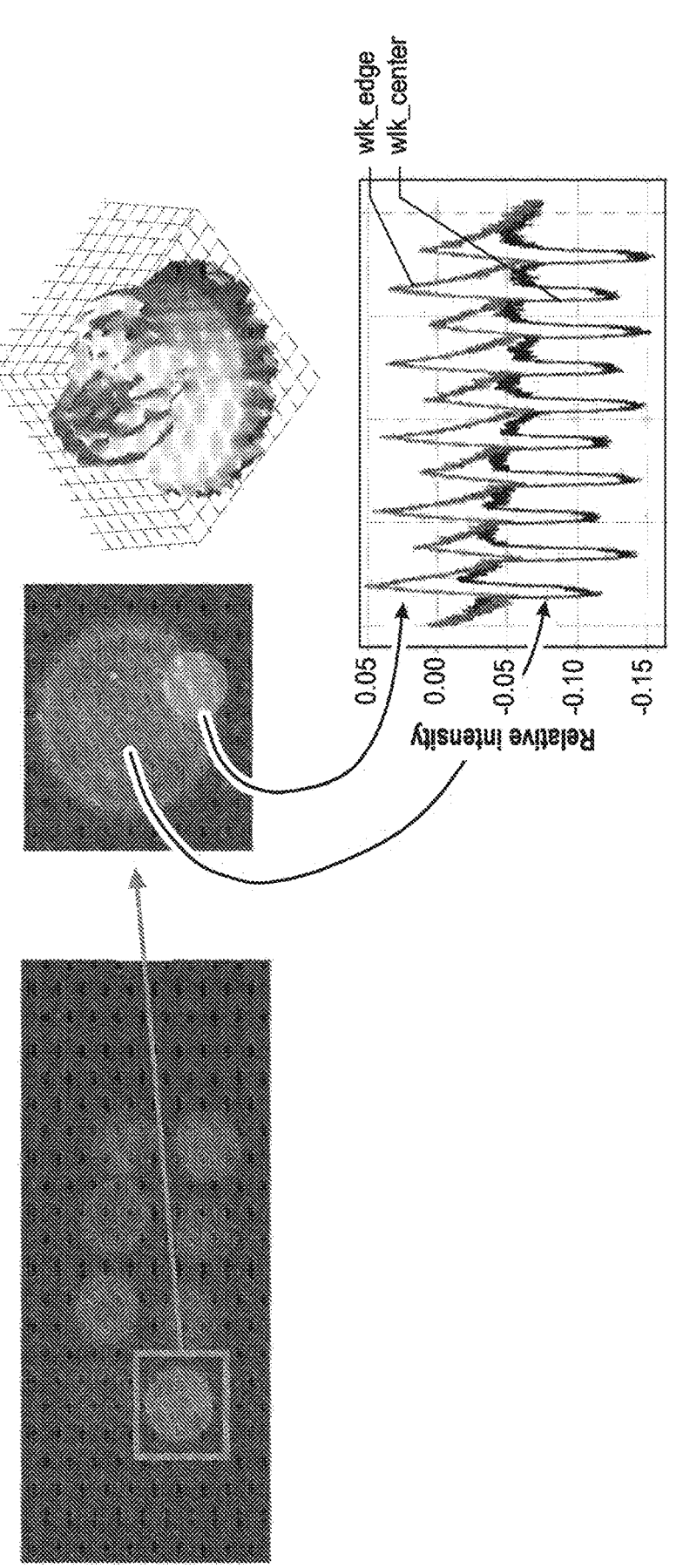
FIG. 17 shows different areas of the same sensor may produce different response. Here we could see a response of WLK sensor toward Ethanol and Methanol vapors. A central area of the spot produce downregulation of the signal, while the outside part of the sensor produces upregulation. This could be explained by different geometry of drying. Visually we could observe a spot and a 'coffee' ring.

It was demonstrated that sensors response it highly depended on the geometry of the sensor—different areas on the sensor produce different, and sometimes opposite response. In FIG. 17 we show a response of WLK sensor toward 10% Ethanol and Methanol vapors. A central area of the spot produces downregulation of the signal, while the outside part of the sensor produces upregulation.

Figure 18:
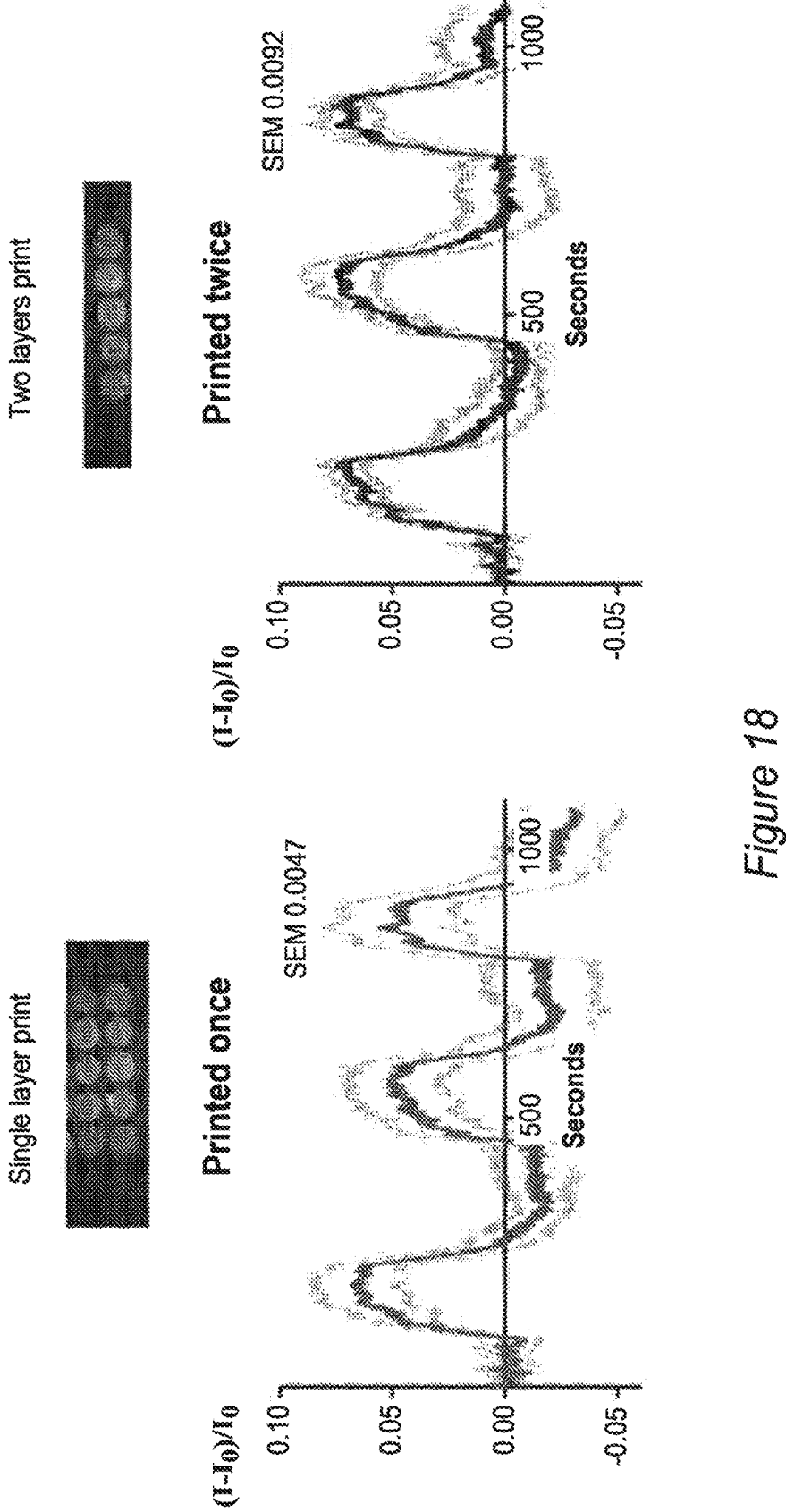
FIG. 18 shows printing dots with liquid handler, 3d printer, inkjet printer or any other could enhance sensor performance. Here we show that two layer deposition of dots (first drying a drop then drying one more drop on top of it) could reduce variability between the sensors in response toward an analyte.

The differences between repeats of the same sensors could be reduced by printing more than one layer of the SWCNTs/peptide complex (FIG. 18). By drop drying the drop with the sensor and then adding one more drop on top of the first reduce the error bars.

Figure 19A:
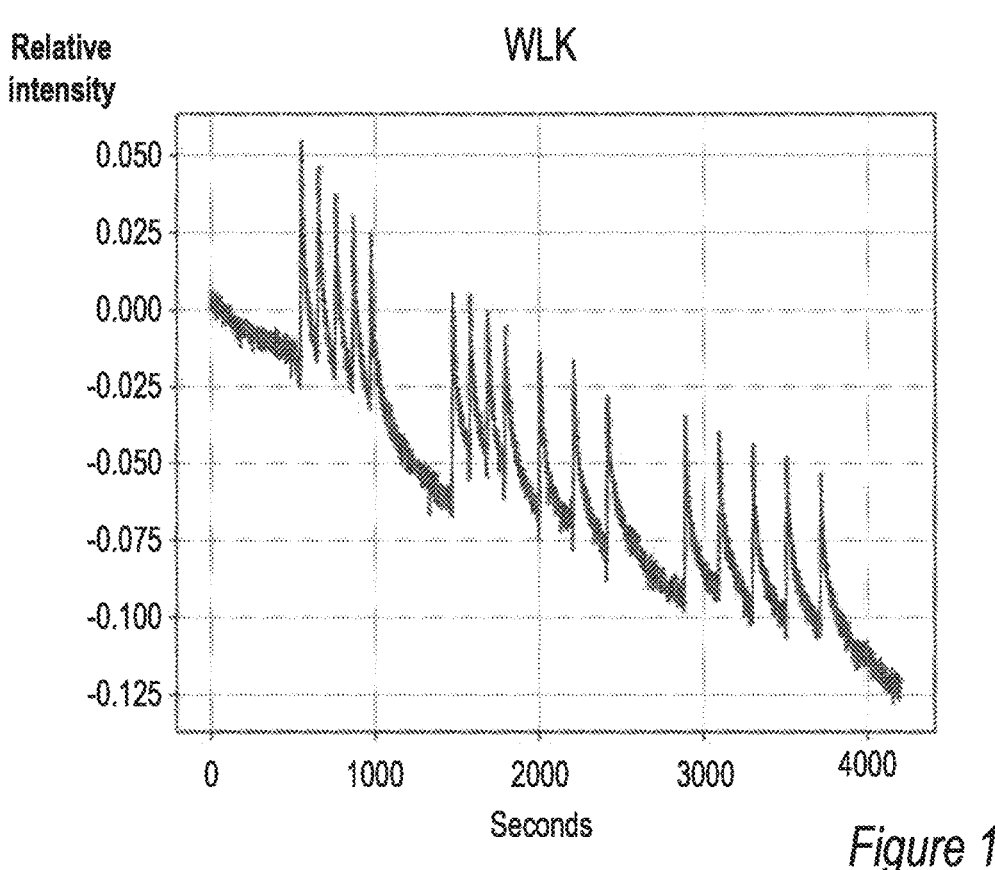
FIGS. 19A-B show a study comparing response of WLK sensor and TC(10) DNA sensor toward vapor of 10% ethanol solution on plastic surface.
Figure 19B:
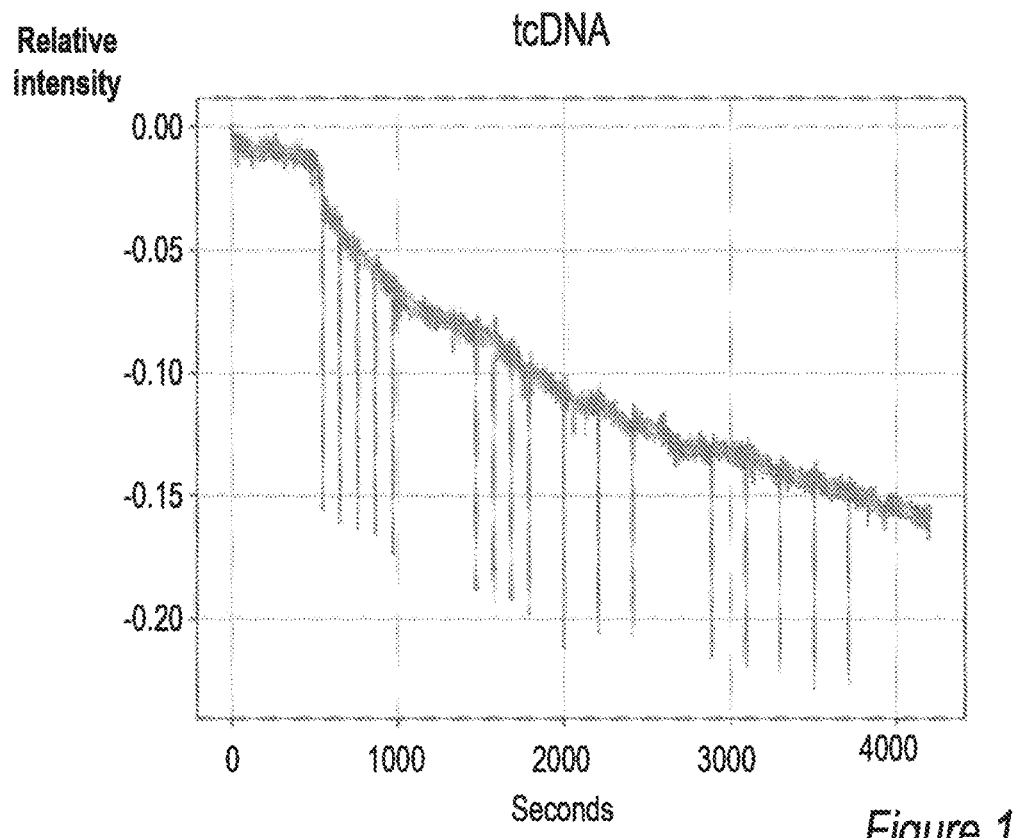

DNA could also be used for the sensors modification. FIG. 19 presents sensor dried on plastic and responded to a 10% ethanol vapor.

Continuously analyzing sensors intensity changes during analyte flow relative to the baseline is one of the possible ways to discriminate between analytes. Another approach is to teach the system to recognize analytes by analyzing a picture of all sensors together, exactly in the way that ML can differentiate between cats and dogs. Moreover, this enables analytes discrimination without requiring any preprocessing or continuous monitoring. To this end, deep learning was harnessed to train the NIRON device to recognize the smells of wine, beer, and vodka.

Figures 20A, 20B, 20C:
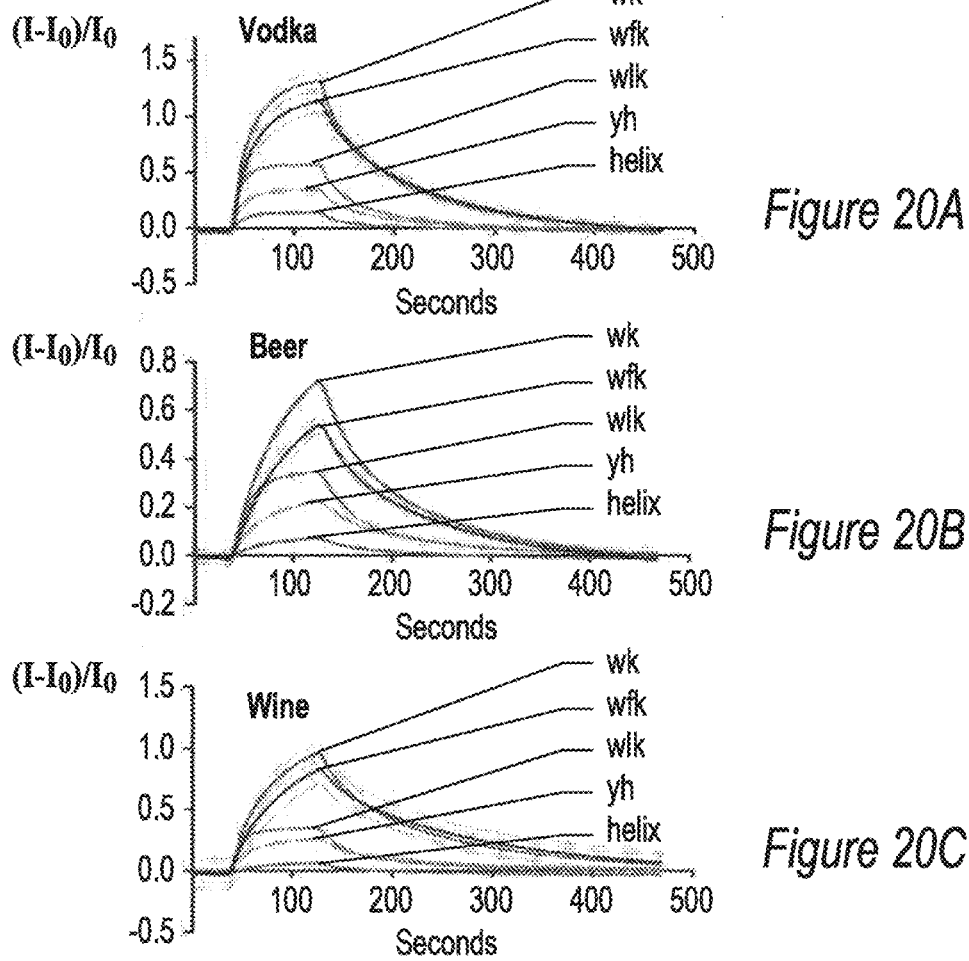
FIGS. 20A-E show the dynamic response of peptide-SWCNTs sensors to different beverages followed by clear airflow. Figures present changes in PL in response to vodka (FIG. 20A), beer (FIG. 20B), and wine (FIG. 20C) vapors.
Figure 20D:
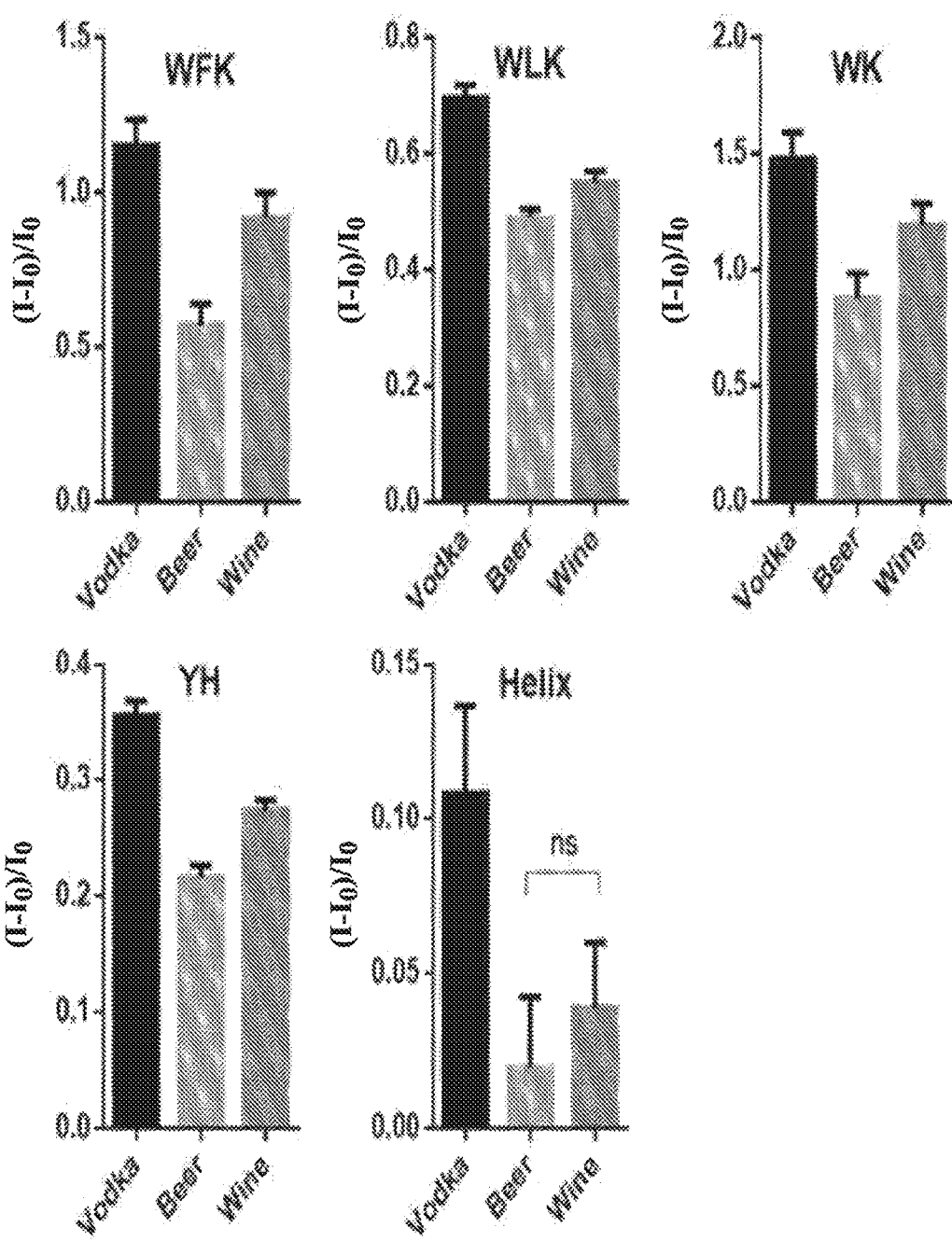
Figure 20E:
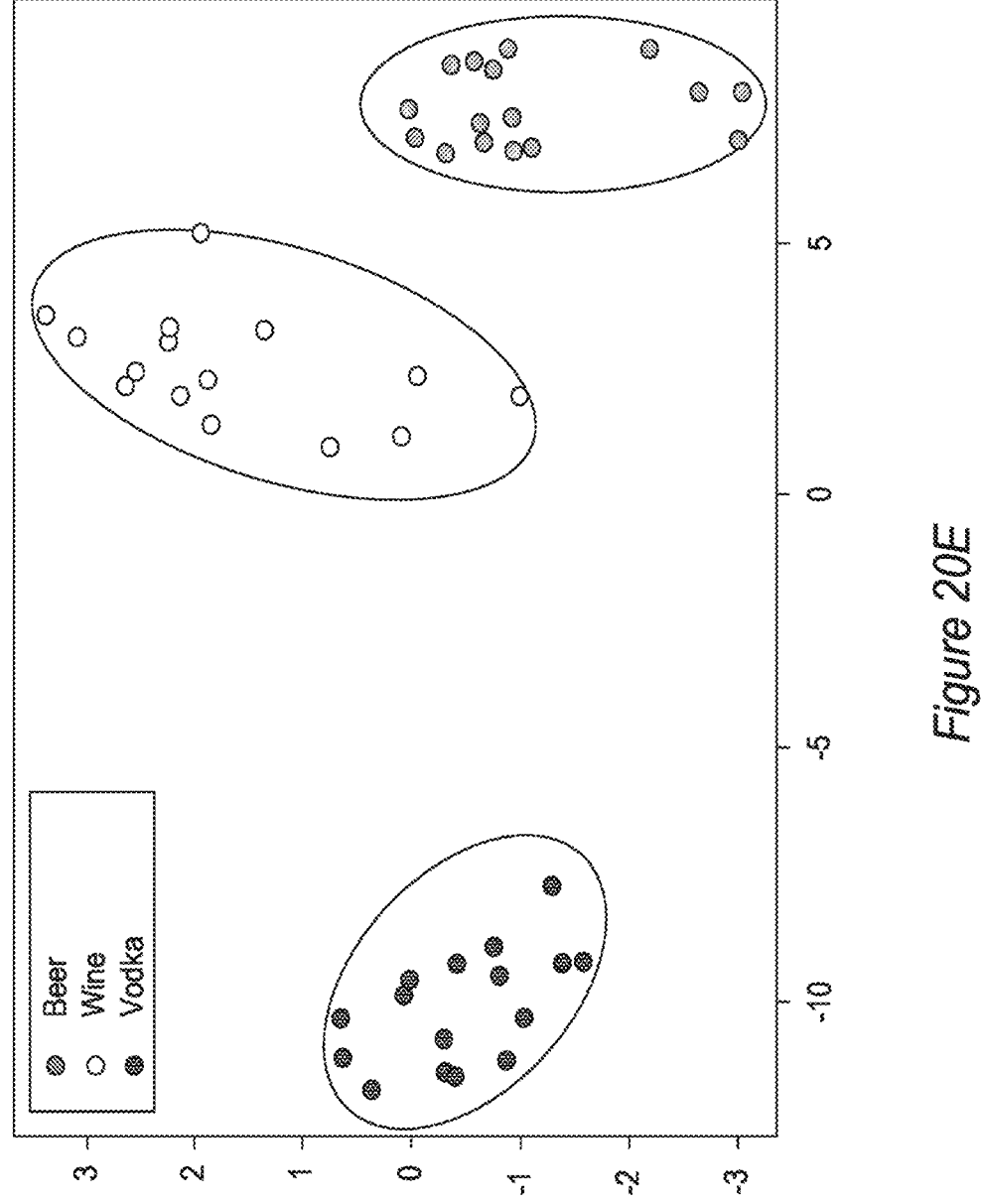
Figures 21A, 21B:
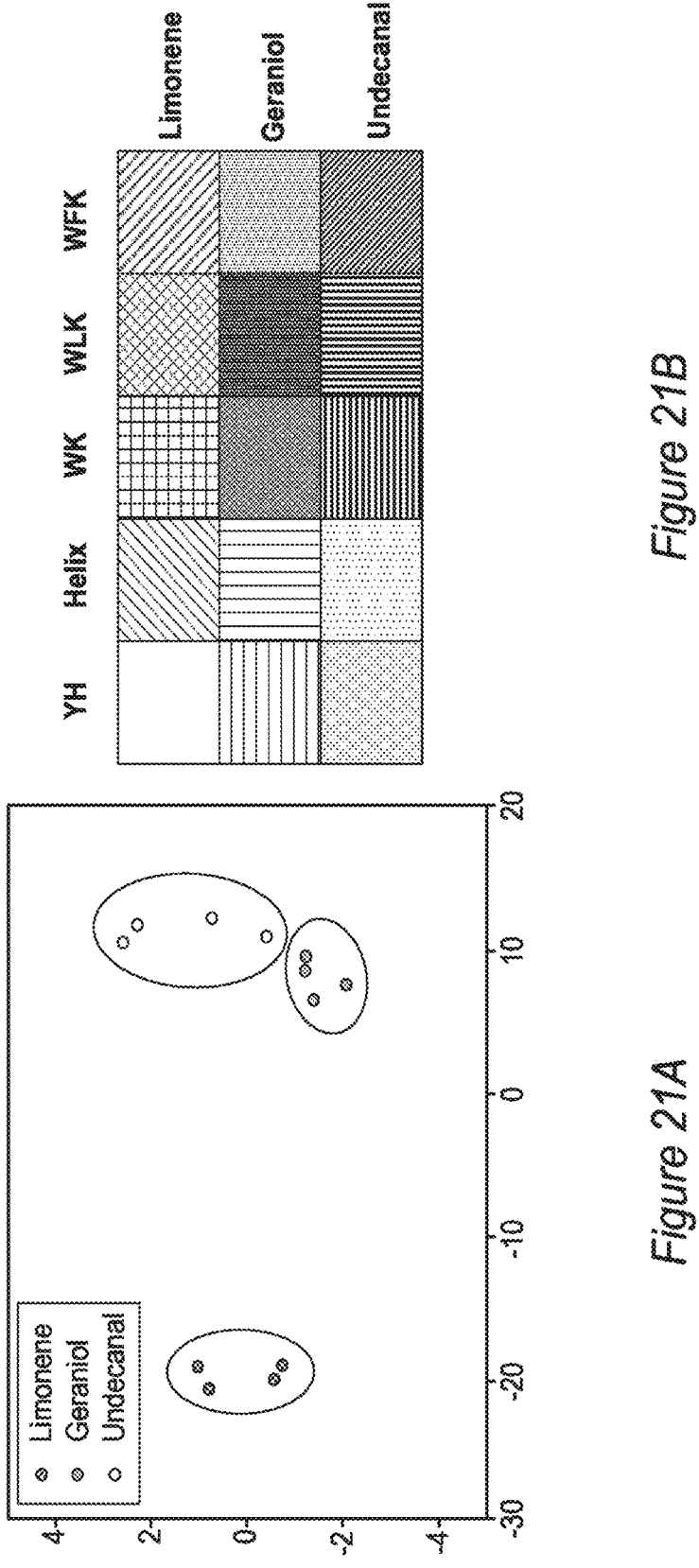
FIGS. 21A-B show the response of peptide-SWCNTs sensors to the vapors of limonene, geraniol and undecanal.

First, the kinetics of the PL responses were analyzed. The overall response of the sensors (FIGS. 20A-D) was in correlation with ethanol percentage, with the highest response observed with vodka (40% ethanol), followed by wine (12.5%), and then by beer (4%). However, sensors responses to wine aroma were higher than to water containing 12.5% ethanol, indicating that other volatile molecules in wine also affect sensors PL. LDA of the response of all sensors demonstrated that they were able to clearly discriminate between the beverages (FIG. 20E). Interestingly, the kinetics of the PL response was significantly different between the analytes. For example, while the response to vodka was the highest among the analytes, most of the sensors To test whether the sensors can react to other volatiles, they were exposed to vapors of limonene, geraniol, and undecanal. Limonene is a monocyclic monoterpene with a lemon-like odor that is widely used as a flavor in perfumes, soaps, foods, and beverages (Sun, 2007). Geraniol is a terpene that is widely used in the flavor and fragrance industries (Chen and Viljoen, 2010). Undecanal is an eleven-carbon aldehyde that is used in perfumes (Indradas et al., 2014). The sensors array readily detected all three molecules in the airflow and efficiently differentiated between them (FIG. 21). The response of all sensors was significantly higher to limonene than to geraniol and undecanal suggesting that the aromatic structure of limonene improves its interaction with the sensor.

The invention claimed is:

1. A sensor array comprising a plurality of substantially dry or water-free sensor devices for simultaneous sensing of multiple volatile compounds (VC) or mixtures thereof present in a gaseous environment, wherein each of the sensor devices comprises a light responsive surface comprising a substantially dry material-wrapped single walled carbon nanotube (SWCNT), each of the sensor devices being configured and operable for allowing a dry or water-free interaction, during operation of the sensor devices for sensing the at least one VC in the gaseous environment, between the at least one VC in the gaseous environment and the substantially dry or water-free SWCNT and/or the material wrapping same; and for emitting NIR photoluminescence indicative of said interaction.

2. The array according to claim 1, wherein the sensor devices are photoluminescent sensor devices, the array being for detecting a change in the gaseous environment of the material-wrapped SWCNT, the change being derived from the interaction between the at least one VC present in the gaseous environment and the SWCNT and/or the material wrapping same.

3. The array according to claim 1, wherein the at least one VC is at least one volatile organic compound (VOC).

4. The array according to claim 1, comprising a single light-responsive area or two or more light-responsive areas.

5. The array according to claim 1, wherein the light-responsive area is operable in the NIR infrared spectral range.

6. The array according to claim 1, wherein the material-wrapped SWCNT is a complex or an association or a composite of a SWCNT and at least one material, the at least one material rendering the SWCNT dispersible in water.

7. The array according to claim 6, wherein the at least one material is selected amongst proteins, polymers, peptides, nucleic acids, ionic surfactants, cationic surfactants, nonionic surfactants, zwitterionic surfactants, amphiphilic macromolecules, block copolymers and organic solvents.

8. The array according to claim 7, wherein the at least one material is an ionic surfactant or a polymer or a peptide or a nucleic acid, optionally DNA and/or RNA.

9. The array according to claim 1, the SWCNT is a chiral semiconductor SWCNT.

10. The array according to claim 9, wherein the SWCNT having a (n, m) value selected from (1,0), (2,0), (4,0), (5,0), (7,0), (8,0), (10,0), (11,0), (13,0), (14,0), (16,0), (2,1), (3,1), (5,1), (6,1), (8,1), (9,1), (11,1), (12,1), (14,1), (15,1), (3,2), (4,2), (6,2), (7,2), (9,2), (10,2), (12,2), (13,2), (15,2), (4,3), (5,3), (7,3), (8,3), (10,3), (11,3), (13,3), (14,3), (5,4), (6,4), (8,4), (9,4), (11,4), (12,4), (14,4), (6,5), (7,5), (9,5), (10,5), (12,5), (13,5), (7,6), (8,6), (10,6), (11,6), (13,6), (8,7), (9,7), (11,7), (12,7), (9,8), (10,8), (12,8), (10,9) and (11,9).

11. The array according to claim 10, wherein the SWCNT is (6,5).

12. The array according to claim 1, wherein the at least one VC is a mixture of volatile compounds identified based on their influence on the photoluminescence of the SWCNT and/or the material wrapping same following interaction with the mixture of VC.

13. The array according to claim 12, wherein the identity of the at least one VC is not known.

14. A method for fabricating a sensor device in array according to claim 1, the method comprising depositing a dispersion of a material-SWCNT complex to a surface region of a substrate, under conditions permitting association of the complex to the surface and drying said deposited dispersion to obtain a substantially dry or water-free sensor device.

15. A system comprising an array of a plurality of devices according to claim 1.

16. The system according to claim 15, further comprising at least one radiation source configured to provide an incident radiation directly proximate to the photoluminescent material and a camera configured to measure an emitted radiation directly proximate from the photoluminescent material at predefined time intervals during the decay time.

17. The system according to claim 15, wherein a change in spectral intensities and/or wavelength of said emitted radiation being indicative of a change or a modulation in the photoluminescence of the SWCNT and of a presence of at least one volatile compound (VC).

18. A system for monitoring a change in a gaseous sample, the system comprising:

one or more devices according to claim 1 for sensing the presence or a change in an amount of volatile compound (VC) over time; each of the one or more devices comprising one or more dry or water-free material-SWCNT complex;

at least one radiation source configured to provide an incident radiation directly proximate to the one or more sensor devices or the one or more material-SWCNT complexes;

a camera configured to measure emitted radiation directly proximate from the one or more sensor devices or the one or more material-SWCNT complexes at predefined time intervals during the decay time;

a computer system comprising a data processing utility comprising an input interface configured and operable for receiving data comprising a plurality of sensing signals independently received from the one or more devices or the one or more material-SWCNT complexes via a computer network; and a data analyzer comprising an analyzer module configured and operable for extracting from the sensing signals one or more VC-related signatures and identifying a volatile emitting status corresponding to the change to be monitored.

19. An optical sensor device for determining presence of at least one volatile compound (VC) in a gaseous environment, the device comprising a light responsive dry or water-free surface comprising a water-free material-wrapped single walled carbon nanotube (SWCNT), the device being configured and operable for allowing in a dry state interaction, during operation of the sensor device for sensing the at least one VC in the gaseous environment, between the at least one VC in the gaseous environment and the SWCNT and/or the material wrapping same; and for emitting NIR photoluminescence indicative of said interaction, wherein the device is substantially water free, or adapted for operation in a substantially dry form.

\* \* \* \* \*